(12) United States Patent
Chen et al.

(10) Patent No.: US 11,295,664 B2
(45) Date of Patent: Apr. 5, 2022

(54) DISPLAY-SYNCHRONIZED OPTICAL EMITTERS AND TRANSCEIVERS

(71) Applicant: Apple Inc., Cupertino, CA (US)

(72) Inventors: Tong Chen, Cupertino, CA (US); Dong Zheng, Los Altos, CA (US); Graeme M. Williams, Santa Clara, CA (US); Mark T. Winkler, San Jose, CA (US); Warren S. Rieutort-Louis, Cupertino, CA (US); Yuchi Che, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/815,875

(22) Filed: Mar. 11, 2020

(65) Prior Publication Data

US 2021/0287602 A1 Sep. 16, 2021

(51) Int. Cl.
*G09G 3/3225* (2016.01)

(52) U.S. Cl.
CPC ....... *G09G 3/3225* (2013.01); *G09G 2310/08* (2013.01); *G09G 2320/064* (2013.01); *G09G 2360/141* (2013.01); *G09G 2370/18* (2013.01)

(58) Field of Classification Search
CPC ............. G09G 3/3225; G09G 2310/08; G09G 2320/064; G09G 2360/141; G09G 2370/18
See application file for complete search history.

(56) References Cited

U.S. PATENT DOCUMENTS

| | | |
|---|---|---|
| 6,556,349 B2 | 4/2003 | Cox et al. |
| 6,586,776 B1 | 7/2003 | Liu |
| 6,919,681 B2 | 7/2005 | Cok et al. |
| 6,946,647 B1 | 9/2005 | O'Neill et al. |
| 6,948,820 B2 | 9/2005 | Veligdan et al. |
| 7,499,094 B2 | 3/2009 | Kuriyama |
| 7,518,462 B2 | 4/2009 | Kanno et al. |

(Continued)

FOREIGN PATENT DOCUMENTS

| | | |
|---|---|---|
| CN | 105531653 | 4/2016 |
| CN | 107180853 | 9/2017 |

(Continued)

OTHER PUBLICATIONS

U.S. Appl. No. 16/905,664, filed Jun. 18, 2020, Chen et al.

(Continued)

*Primary Examiner* — Peter D McLoone

(74) *Attorney, Agent, or Firm* — Brownstein Hyatt Farber Schreck, LLP

(57) ABSTRACT

In some embodiments, a device includes a light-emitting display, and an optical emitter positioned behind the light-emitting display. The optical emitter is configured to emit light through the light-emitting display. A processor is configured to synchronize a first illumination timing of the optical emitter and a second illumination timing of the light-emitting display. In some embodiments, a device includes an optical transceiver processor and a display processor. The display processor is configured to output timing information to a light-emitting display and to the optical transceiver processor, and the optical transceiver processor is configured to cause an optical transceiver to emit or receive light in synchronization with the timing information output by the display processor.

19 Claims, 20 Drawing Sheets

(56) References Cited

U.S. PATENT DOCUMENTS

| | | | |
|---|---|---|---|
| 7,706,073 B2 | 4/2010 | Munro | |
| RE41,673 E | 9/2010 | Ma | |
| 7,842,246 B2 | 11/2010 | Wohlstadter et al. | |
| 8,077,393 B2 | 12/2011 | Steenblik | |
| 8,305,400 B2 | 11/2012 | Otani | |
| 8,603,642 B2 | 12/2013 | Hatwar et al. | |
| 8,664,655 B2 | 3/2014 | Lee et al. | |
| 8,743,027 B2 | 6/2014 | Wu et al. | |
| 8,780,065 B2 | 7/2014 | Ribeiro et al. | |
| 9,007,349 B2 | 4/2015 | Tseng | |
| 9,112,043 B2 | 8/2015 | Arai | |
| 9,183,779 B2 | 11/2015 | Soto | |
| 9,342,181 B2 | 5/2016 | Wyatt et al. | |
| 9,530,381 B1 | 12/2016 | Bozarth et al. | |
| 9,570,002 B2 | 2/2017 | Sakariya et al. | |
| 9,614,168 B2 | 4/2017 | Zhang et al. | |
| 9,741,286 B2 | 8/2017 | Sakariya et al. | |
| 9,870,075 B2 | 1/2018 | Han et al. | |
| 9,909,862 B2 | 3/2018 | Ansari et al. | |
| 10,079,001 B2 | 9/2018 | Hodges | |
| 10,090,574 B2 | 10/2018 | Wu | |
| 10,115,000 B2 | 10/2018 | Mackey et al. | |
| 10,222,475 B2 | 3/2019 | Pacala | |
| 10,290,266 B2 | 5/2019 | Kurokawa | |
| 10,331,939 B2 | 6/2019 | He et al. | |
| 10,410,037 B2 | 9/2019 | He et al. | |
| 10,453,381 B2 | 10/2019 | Kurokawa | |
| 10,474,286 B2 | 11/2019 | Bae et al. | |
| 10,565,734 B2 | 2/2020 | Bevensee et al. | |
| 10,637,008 B2 | 4/2020 | Harada et al. | |
| 10,664,680 B2 | 5/2020 | Xu et al. | |
| 10,713,458 B2 | 7/2020 | Bhat et al. | |
| 10,809,853 B2 | 10/2020 | Klenkler et al. | |
| 10,838,556 B2 | 11/2020 | Yeke Yazdandoost et al. | |
| 10,872,222 B2 | 12/2020 | Gao et al. | |
| 2003/0148391 A1 | 8/2003 | Salafsky | |
| 2004/0209116 A1 | 10/2004 | Ren et al. | |
| 2012/0113357 A1 | 5/2012 | Cheng et al. | |
| 2013/0113733 A1 | 5/2013 | Lim et al. | |
| 2013/0194199 A1* | 8/2013 | Lynch | G06F 3/0421 345/173 |
| 2015/0309385 A1 | 10/2015 | Shu et al. | |
| 2017/0270342 A1 | 9/2017 | He et al. | |
| 2018/0032778 A1 | 2/2018 | Lang | |
| 2018/0323243 A1 | 11/2018 | Wang | |
| 2018/0349667 A1* | 12/2018 | Kim | G06K 9/0002 |
| 2019/0034686 A1 | 1/2019 | Ling et al. | |
| 2019/0130155 A1* | 5/2019 | Park | G09G 3/3208 |
| 2019/0221624 A1 | 7/2019 | Lin et al. | |
| 2019/0293849 A1 | 9/2019 | Du et al. | |
| 2019/0347987 A1* | 11/2019 | Zhao | G09G 3/3225 |
| 2020/0051499 A1* | 2/2020 | Chung | G09G 5/377 |
| 2020/0209729 A1 | 7/2020 | Chen et al. | |
| 2020/0241138 A1 | 7/2020 | Allen et al. | |
| 2020/0265206 A1* | 8/2020 | Chung | G06F 21/32 |
| 2020/0293741 A1 | 9/2020 | Du | |
| 2020/0342194 A1 | 10/2020 | Bhat et al. | |
| 2021/0050385 A1 | 2/2021 | Chuang et al. | |
| 2021/0064159 A1 | 3/2021 | Yeke Yazdandoost et al. | |
| 2021/0089741 A1 | 3/2021 | Yeh et al. | |
| 2021/0091342 A1 | 3/2021 | Chen et al. | |

FOREIGN PATENT DOCUMENTS

| | | |
|---|---|---|
| CN | 107271404 | 10/2017 |
| CN | 108292361 | 7/2018 |
| CN | 108885693 | 11/2018 |
| CN | 109983471 | 7/2019 |
| EP | 2463927 | 8/2013 |
| EP | 3404484 | 11/2018 |
| JP | H0642898 | 2/1994 |
| WO | WO 17/204777 | 11/2017 |
| WO | WO 18/093798 | 5/2018 |
| WO | WO 18/186580 | 10/2018 |
| WO | WO 18/210317 | 11/2018 |

OTHER PUBLICATIONS

U.S. Appl. No. 16/945,643, filed Jul. 31, 2020, Chuang et al.
U.S. Appl. No. 16/945,174, filed Jul. 31, 2020, Chen et al.
U.S. Appl. No. 17/003,636, filed Aug. 26, 2020, Yeh et al.
U.S. Appl. No. 17/003,732, filed Aug. 26, 2020, Chen et al.
U.S. Appl. No. 17/006,708, filed Aug. 28, 2020, Ran et al.
U.S. Appl. No. 17/028,775, filed Sep. 22, 2020, Yeke Yazdandoost et al.
Gelinck et al., "X-Ray Detector-on-Plastic With High Sensitivity Using Low Cost, Solution-Processed Organic Photodiodes," IEEE, 2015, pp. 1-8.
Garcia de Arquer et al., "Solution-processed semiconductors for next-generation photodetectors," *Nature Reviews—Materials*, 2017, vol. 2, No. 16100, pp. 1-16.
U.S. Appl. No. 17/200,683, filed Mar. 12, 2021, Einzinger et al.

\* cited by examiner

DISPLAY-SYNCHRONIZED OPTICAL EMITTERS AND TRANSCEIVERS

FIELD

The described embodiments relate to electronic devices (e.g., smartphones, tablet computers, laptop computers, wearable devices, standalone or wall-mounted display screens, and other devices) having under-display optical emitters or transceivers.

BACKGROUND

In some cases, it may be desirable to determine whether an object or user is proximate to a device, to determine the distance between an object or user and a device, or to determine a velocity or acceleration of an object or user with respect to a device. It may also be desirable to capture a two-dimensional (2D) or three-dimensional (3D) image of an object or user that is proximate to a device. In some cases, the 2D or 3D image may be an image of a fingerprint, a face, or a scene in a field of view (FoV). In some cases, it may be useful to wirelessly transmit or receive information between devices. It may also be useful to acquire images or data pertaining to a device's environment. In all of these cases, the measurements, images, or other data may be sensed or acquired optically.

SUMMARY

Embodiments of the systems, devices, methods, and apparatus described in the present disclosure are directed to under-display optical emitters or transceivers. In accordance with described techniques, an optical emitter or transceiver may be positioned under (or behind) a device's display, and light may be transmitted and/or received through translucent or transparent apertures extending from a front surface to a back surface of the display. In this manner, an optical transceiver may transmit and receive "through" a display. When an optical transceiver is positioned under a device's display, a portion of the device's display surface does not have to be reserved for the optical transceiver, and in some cases the device's display area may be increased. However, when an optical emitter or transceiver is positioned under a device's display, its optical emissions may undesirably interfere with the display's operation. Synchronizing the emissions of the optical emitter/transceiver and the emissions of the display can improve a user's experience when they are viewing images on the display.

In a first aspect, the present disclosure describes a device including a light-emitting display, an optical emitter positioned behind the light-emitting display and configured to emit light through the light-emitting display, and a processor. The processor may be configured to synchronize a first illumination timing of the optical emitter and a second illumination timing of the light-emitting display.

In another aspect, the present disclosure describes an electronic device. The electronic device may include an optical transceiver processor and a display processor. The display processor may be configured to output timing information to a light-emitting display and to the optical transceiver processor. The optical transceiver processor may be configured to cause an optical transceiver to emit or receive light in synchronization with the timing information output by the display processor.

In still another aspect of the disclosure, a sensing method is described. The sensing method may include modulating a set of pixels in a light-emitting display to generate a first optical output; modulating, in synchronization with the modulation of the set of pixels in the light-emitting display, a light output of an optical transceiver configured to emit light through the light-emitting display; and sensing a portion of the light output using the optical transceiver.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
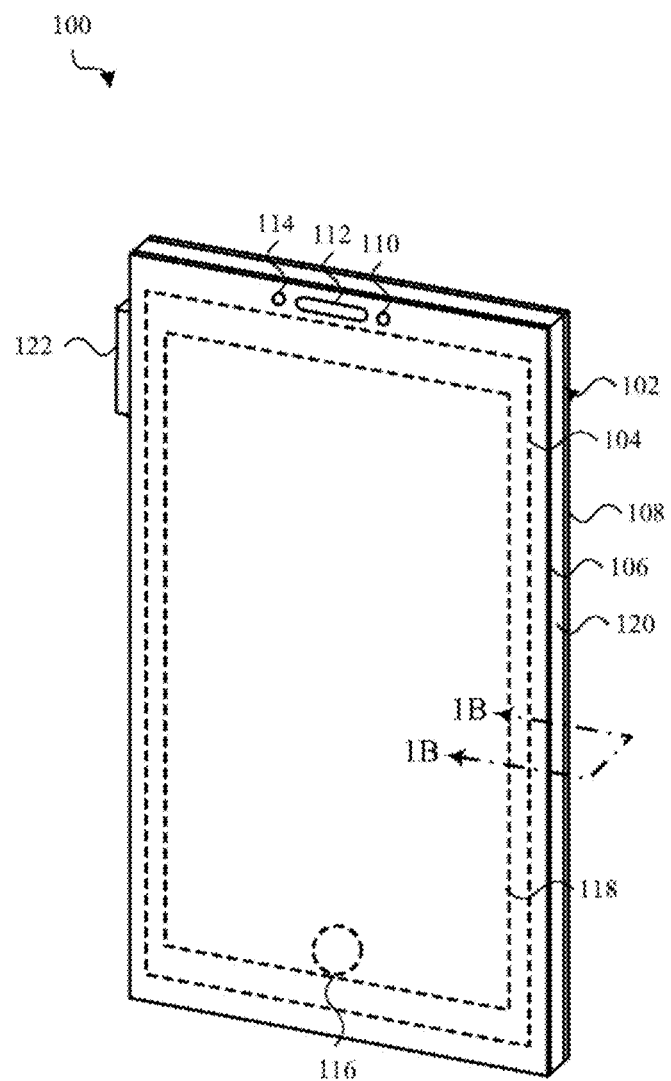
FIGS. 1A and 1B show an example embodiment of a device having a display and an under-display optical transceiver.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

To maximize the display area of an electronic device, an optical emitter or transceiver may be positioned behind the active area of a device's display. An optical transceiver (or optical sensing transceiver) may be variously configured or deployed as: a proximity sensor (or ranging sensor); a two-dimensional (2D) or three-dimensional (3D) camera in combination with a flood illuminator or structured light source; a bio-authentication sensor (e.g., an infrared (IR) facial recognition sensor or fingerprint sensor); an eye/gaze tracker, device tracker, or other optical tracking system; an optical communication system or wireless communicator or controller; a time-of-flight (ToF) sensor (e.g., a short pulse optical source and a single-photon avalanche-diode (SPAD) detector or SPAD array); and so on.

When an optical emitter or transceiver is positioned under a device's display, an area adjacent the display does not have to be reserved for the optical emitter or one or more components of the transceiver (e.g., the transceiver's transmitter or receiver). In some cases, this may facilitate an increase in the size of the device's display area. However, when an optical emitter or transceiver is positioned under a device's display, its optical emissions may undesirably interfere with the display's operation. For example, the emissions of the optical emitter/transceiver may undesirably mix with the light emitted by the display, thereby degrading a user's experience when they are viewing images on the display, or the emissions of the optical emitter/transceiver may impact or degrade the display's components and/or signaling (and again, degrade the user's experience).

Poly-silicon-based thin-film transistors (TFTs) on a flexible backfilm are the backbone of modern display drivers, such as organic light-emitting display (OLED) drivers. However, poly-silicon is photosensitive to a wide range of the optical spectrum, and when exposed to irradiation by an under-display optical emitter or transceiver (e.g., a behind-OLED (B-OLED) sensor), an unwanted bias current can be generated in the poly-silicon-based TFTs, and distortions in OLED emissions (or emissions by other types of light-emitting elements) can occur. The distortions can occur in both the intensity and time domains, and can degrade or even interrupt an image, or sequence of images, displayed by the display. Furthermore, due to the trapping and accumulation of photoelectrons and carriers in both the poly-silicon and its backfilm, a user may notice temporary or permanent image sticking (also known as image persistence or image retention), which can further degrade the user's experience.

On the optical emitter/transceiver side, the severity of OLED emission distortion and/or image sticking may depend on parameters such as emitter wavelength, beam size, irradiation level, pulse duration, and/or pulse timing. On the display side, the severity of OLED emission distortion and/or image sticking may depend on the OLED TFT architecture/layout, display timing, display brightness, display content, and so on.

The present disclosure describes systems, devices, methods, and apparatus in which the timing of emissions by a light-emitting display and under-display optical emitter/transceiver are synchronized. Synchronized emissions can reduce the interference between display emissions and under-display optical emitter/transceiver emissions, and can improve a user's experience. These and other embodiments are discussed with reference to FIGS. 1A-13. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
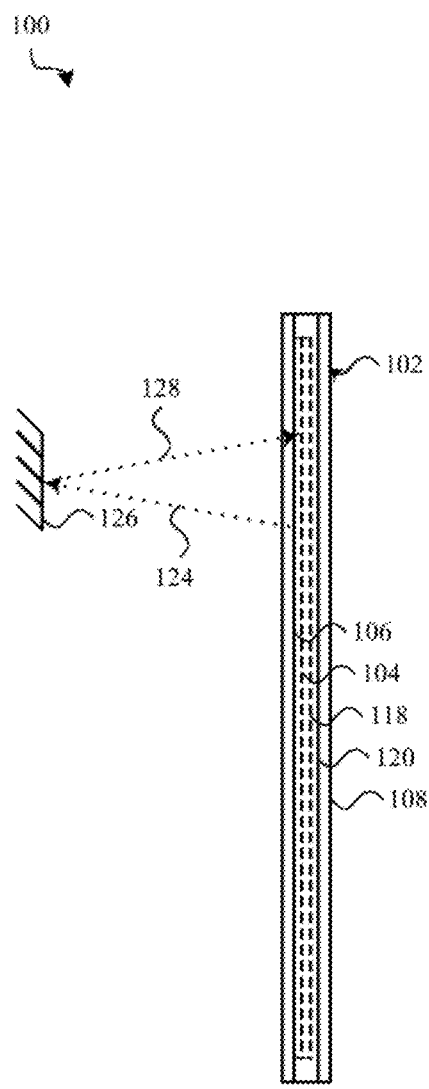

FIGS. 1A and 1B show an example of a device 100 having a display 104 and an under-display optical transceiver 118. More particularly, FIG. 1A shows a perspective view of the front of the device 100, and FIG. 1B shows an elevation of a side of the device 100 (taken from the view of sight line 1B-1B in FIG. 1A). The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device, including, for example, a mobile phone, tablet computer, laptop computer, portable music player, health monitoring device, wearable device (e.g., an electronic watch or health monitoring device), portable terminal, or other portable or mobile device. The device 100 could also be a device that is semi-permanently located or installed at a single location (e.g., a display screen, security screen, control screen, electronic kiosk display, or television).

The device 100 may include a housing 102 that at least partially surrounds or supports a display 104. In some examples, the housing 102 may include or support a front cover 106 and/or a rear cover 108. The front cover 106 may be positioned over the display 104, and may provide a window through which the display 104 may be viewed. In some embodiments, the display 104 may be attached to (or abut) the housing 102 and/or the front cover 106.

The front of the device 100 may include one or more front-facing cameras 110, speakers 112, microphones, or other components 114 (e.g., audio, imaging, or sensing components) that are configured to transmit or receive signals to/from the device 100. In some cases, a front-facing camera 110, alone or in combination with other sensors, may be configured to operate as a bio-authentication sensor (e.g., a facial recognition sensor). The device 100 may also include various input devices, including a mechanical or virtual button 116 which may be accessible from the front surface (or display surface) of the device 100. In some cases, the front-facing camera 110, virtual button 116, and/or other sensors of the device 100 may be integrated with a display stack of the device 100 and positioned under the display 104. For example, the front-facing camera(s) 110, virtual button 116, and/or other components may be provided by one or more optical transceivers 118 positioned under the display 104. An under-display optical transceiver 118 may also be configured as (or provide) a proximity sensor; a 2D or 3D camera in combination with a flood illuminator or structured light source; a bio-authentication sensor (e.g., a facial recognition sensor or fingerprint sensor); an eye/gaze tracker, device tracker, or other optical tracking system; an optical communication system; and so on. Alternatively, the one or more optical transceivers 118 could be replaced by, or supplemented with, one or more optical emitters.

The device 100 may include buttons or other input devices positioned along a sidewall 120 of the housing 102 and/or on a rear surface of the device 100. For example, a volume button or multipurpose button 122 may be positioned along the sidewall 120, and in some cases may extend through an aperture in the sidewall 120. By way of example, the rear surface of the device 100 may include a rear-facing camera or other optical sensor. A flash or light source may also be positioned along the rear of the device 100 (e.g., near the rear-facing camera). In some cases, the rear surface of the device 100 may include multiple rear-facing cameras.

The display 104 may include one or more light-emitting elements. For example, the display 104 may include one or more semiconductor light-emitting elements, such as light-emitting diodes (LEDs); one or more semiconductor-driven electroluminescent light-emitting elements, such as OLEDs that include organic materials charged by TFTs; or other types of light-emitting elements (e.g., liquid crystal display (LCD) elements, or electroluminescent (EL) display elements). The display 104 may also include, or be associated with, one or more touch and/or force sensors that are configured to detect a touch and/or a force applied to a surface of the front cover 106.

The various components of the housing 102 may be formed from the same or different materials. For example, the sidewall 120 may be formed using one or more metals (e.g., stainless steel), polymers (e.g., plastics), ceramics, or composites (e.g., carbon fiber). In some cases, the sidewall 120 may be a multi-segment sidewall including a set of antennas. The antennas may form structural components of the sidewall 120. The antennas may be structurally coupled (to one another or to other components) and electrically isolated (from each other or from other components) by one or more non-conductive segments of the sidewall 120. The front cover 106 may include, for example, one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover) may be coated with an opaque ink to obscure components included within the housing 102. The rear cover 108 may be formed using the same material(s) that are used to form the sidewall 120 or the front cover 106. In some cases, the rear cover 108 may be part of a monolithic element that also forms the sidewall 120 (or in cases where the sidewall 120 is a multi-segment sidewall, those portions of the sidewall 120 that are non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 120 to cover an opening defined by the sidewall 120 (i.e., an opening into an interior volume in which various electronic components of the device 100, including the display 104 and optical transceiver 118, may be positioned). The front cover 106 may be mounted to the sidewall 120 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensing system) may be configured to detect a touch applied to an outer surface of the front cover 106 (e.g., to a display surface of the device 100).

In some cases, a force sensor (or part of a force sensing system) may be positioned within the interior volume below and/or to the side of the display 104. In some cases, the force sensor (or force sensing system) may be triggered in response to the touch sensor detecting one or more touches on the front cover 106 (or a location or locations of one or more touches on the front cover 106), and may determine an amount of force associated with each touch, or an amount of force associated with the collection of touches as a whole. Alternatively, operation of the touch sensor (or touch sensing system) may be triggered in response to the force sensor (or force sensing system) detecting an amount of force (e.g., an amount of force exceeding a threshold amount) on the front cover 106. Alternatively, the force sensor (or force sensing system) may be configured to detect a location or centroid of one or more touches, thereby functioning as both a force sensor and a touch sensor.

FIG. 1B shows light 124 being emitted from an optical emitter (or optical transmitter) of an optical transceiver 118 positioned under (or behind) the display 104. The emitted light 124 may travel from the optical emitter toward the front cover 106, and may pass through the front cover 106. After passing through the front cover 106, the emitted light 124 may travel toward an object 126, such as a user's finger, face, or ear, reflect or scatter from the object 126, and travel back toward the device 100 as reflected or scattered light 128. The reflected or scattered light 128 may pass through the display 104 and be received by an optical receiver of the optical transceiver 118. A processor of the device 100 may then determine a proximity of the object 126 to the device 100. The processor may also or alternatively make other determinations based on the emitted and received light 124, 128, or based on light received (but not emitted) by the device 100. For example, the processor may analyze a 2D or 3D image acquired by the optical transceiver 118; or enroll or authenticate a user's face or fingerprint; or determine the distance or direction to, or the topography, position, or motion of, the object 126.

Figure 2A:
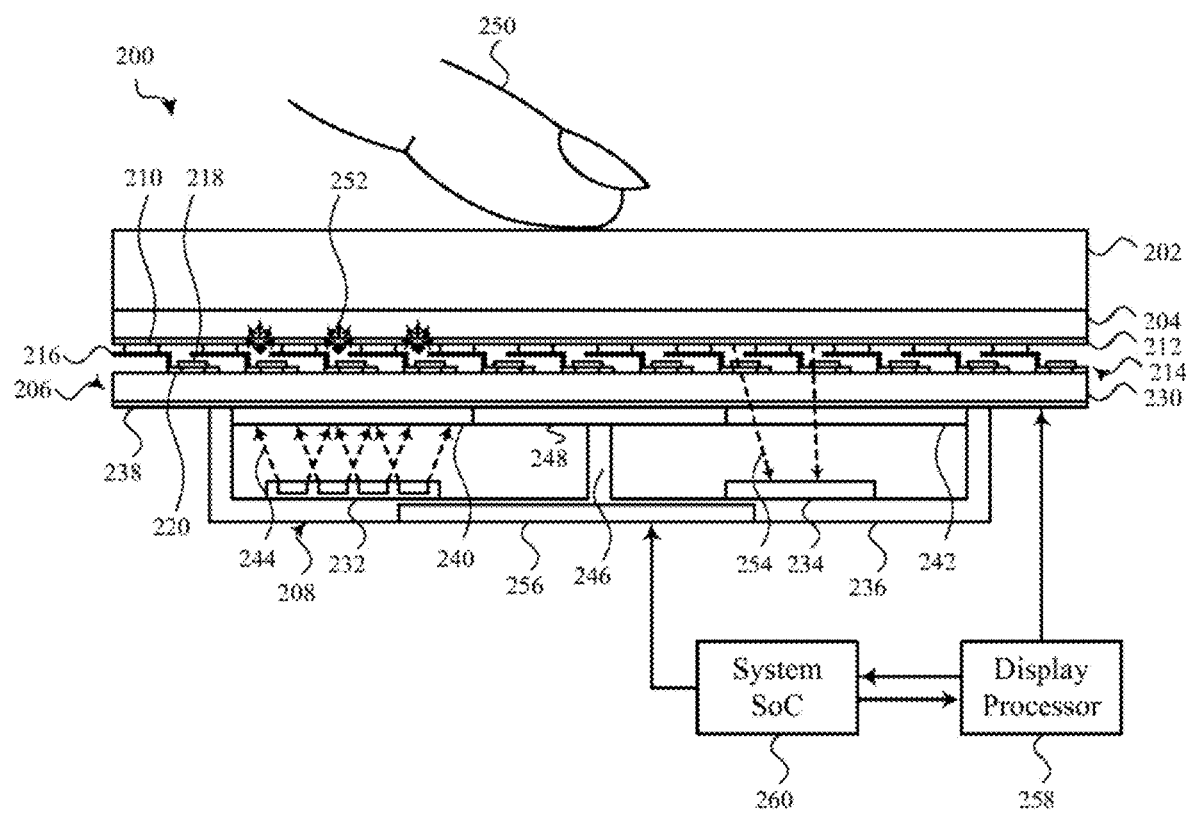
FIGS. 2A and 2B show an example elevation of a display stack including an optical transceiver, and illustrate light that propagates through the display stack.

FIG. 2A shows an example elevation of a display stack 200. The display stack 200 may include a cover 202, a touch sensor 204, a display 206, and/or an optical transceiver 208

(which could alternatively just be an optical emitter). The touch sensor 204 may be positioned under the cover 202, the display 206 may be positioned under the touch sensor 204, and the optical transceiver 208 may be positioned under the display 206. In some cases, the display stack 200 may be included in the device 100 described with reference to FIGS. 1A and 1B. With respect to FIG. 2A, "under" means more interior to a device that includes the display stack 200.

The cover 202, touch sensor 204, display 206, and/or optical transceiver 208 may be abutted or attached to one another (e.g., using one or more adhesives or other materials). The cover 202 may include, for example, one or more of glass, a crystal (e.g., sapphire), or a transparent polymer (e.g., plastic) that enables a user to view the display 206 through the cover 202. The cover 202 may be more or less rigid, may provide an exterior surface that a user may touch or press, and may protect the touch sensor 204, display 206, optical transceiver 208 and/or other components that are interior to a device.

The touch sensor 204 may include an array (or grid) of touch sensing elements, with each touch sensing element being configured to generate (or alter) an output signal when the cover 202 is touched at a location above and proximate to the touch sensing element. The touch sensing elements may use capacitive, resistive, ultrasonic, optical, or other touch sensing technologies. Depending on the technology used, the touch sensor 204 may include discrete touch sensing elements (e.g., strain gauges or ultrasonic transceivers) or arrays of elements that cooperate to form touch sensing elements (e.g., first and second layers of electrodes in which a first set of electrodes in a first layer is oriented in a first direction, a second set of electrodes in a second layer is oriented in a second direction, and a different touch sensing element is formed at each location where an electrode in the first set overlaps an electrode in the second set).

The display 206 may be any type of electronic display, such as any of the display types described with reference to FIGS. 1A-1B. By way of example, the display 206 may be an OLED display. In one example of an OLED display, the display 206 may include a set of light-emitting elements 210. Alternatively, the light-emitting elements 210 may be LEDs or other types of light-emitting elements. The light-emitting elements 210 may be arranged in an array having two or more dimensions (e.g., in an array having first and second dimensions that are orthogonal to each other and parallel to the exterior surface of the cover 202; or in a three-dimensional array having first and second dimensions that are orthogonal to each other and parallel to the exterior surface of the cover 202, and a third dimension that is perpendicular the exterior surface of the cover 202). In the case of an OLED display, the light-emitting elements 210 may be formed using an organic material. The light-emitting elements 210 may have the same or different properties, and may be configured (e.g., color filtered) to emit the same or different colors of light. In some embodiments, the light-emitting elements may include red, green, and blue light-emitting elements arranged in accordance with a particular display pixel layout.

The display 206 may include a set of one or more cathodes, which in some cases may take the form of a single planar cathode 212 coupled to first surfaces of the light-emitting elements 210 (e.g., to cover-facing surfaces of the light-emitting elements 210). The display 206 may further include a backplane 214 (or display backplane) that is electrically coupled to second surfaces of the light-emitting elements 210 (e.g., to optical transceiver-facing surfaces of the light-emitting elements 210). The backplane 214 may include a set of anodes 216 coupled to the set of light-emitting elements 210.

The backplane 214 may include a set of transistors 218 and/or other components (e.g., resistors, capacitors, and so on), and a set of conductive metal traces, conductive traces, and/or conductive vias (collectively and generally referred to herein as a set of conductors 220). In some embodiments, the transistors 218 may include TFTs and/or the conductors 220 may include thin film conductors. The conductors 220 may electrically couple the light-emitting elements 210 to the transistors 218 or other components. The conductors 220 may also electrically couple the transistors 218 or other components to each other, to other components within the backplane 214, and/or to other components outside the backplane 214 (e.g., drivers, sensors, converters, controllers, and so on). Each light-emitting element 210 may be coupled to one or more of the conductors 220 at, or via, one of the anodes 216, and each transistor 218 may be coupled to one or more of the conductors 220 at, or via, a conductive pad.

A backfilm 230, such as one or multiple layers of polymer material, may be positioned under the backplane 214. In some cases, the backfilm 230 may function as a substrate on which other layers of the backplane 214 are formed.

The optical transceiver 208 may include an optical emitter 232, an optical receiver 234, and an optical transceiver processor 256. The optical emitter 232 may include one or multiple emitters (e.g., one emitter or an array of emitters). The optical receiver 234 may include one or multiple photodetectors, and in some embodiments may include a 2D or 3D camera. The optical transceiver processor 256 may transmit and receive signals (e.g., drive, control, and/or data signals) to/from the optical emitter 232 and the optical receiver 234.

The components 232, 234 of the optical transceiver 208 may be supported by an optical module frame 236 or housing that is abutted to or attached to the backfilm 230. In some embodiments, walls of the frame 236 may be adhesively bonded to the backfilm 230 by an adhesive 238.

Optionally, one or more lenses or other optical elements 240 may be attached to the frame 236 such that they are disposed in an optical emission path of the optical emitter 232. One or more additional lenses or other optical elements 242 may be attached to the frame 236 such that they are disposed in an optical reception path of the optical receiver 234. The lenses or other optical elements 240, 242 may variously focus, collimate, fan-out, or shape the light 244 emitted by the optical emitter 232 or the light 254 received by the optical receiver 234. In some embodiments, the optical emitter 232 and optical receiver 234, and/or the optical elements 240 or 242, may be separated by a light blocking wall 246 or spacer 248 that prevents light 244 emitted by the optical emitter 232 from impinging directly, or too easily, on the optical receiver 234. Typically, it is desirable for light 244 emitted by the optical emitter 232 to impinge on an object 250 external to the cover 202 before being reflected or scattered back toward the optical receiver 234.

In operation, the optical emitter 232 may emit light 244 toward the cover 202, and a portion of the light 244 may pass through the display 206 as light 252. A portion of the light 252 that passes through the display 206 may also pass through the touch sensor 204 and cover 202, and reflect or scatter from the surface of one or more objects 250. The object(s) 250 may be on, near, or far from the exterior surface of the cover 202. A portion of the light that reflects or scatters from the object(s) 250 may pass back through the cover 202, touch sensor 204, and display 206, and may be received by the optical receiver 234.

A portion of the light 244 emitted by the optical emitter 232 may also impinge on the backfilm 230, conductors 220, transistors 218, anodes 216, light-emitting elements 210, and/or other elements of the display stack 200 and be absorbed by these elements. This may interfere with the operation of the transistors 218, light-emitting elements 210, or other elements, and may cause the display 206 to experience distortion and/or image sticking. However, the distortion or image sticking may be lessened, or eliminated, by synchronizing the emissions of the display 206 and optical transceiver 208. In some cases, the synchronization may be achieved by means of a display processor 258 providing timing information for the display 206 (e.g., one or more display synchronization signals) to the optical transceiver processor 256. In some cases, the display processor 258 may provide the timing information to the optical transceiver processor 256 via a system processor 260 (e.g., a System on a Chip (SoC) or other type of processor). In some cases, the optical transceiver processor 256 and display processor 258 may be implemented as application-specific integrated circuits (ASICs). In alternative embodiments, aspects of the various processors 256, 258, 260 may be more or less integrated, with the functions of two or all three of the processors being integrated in some examples.

Figure 2B:
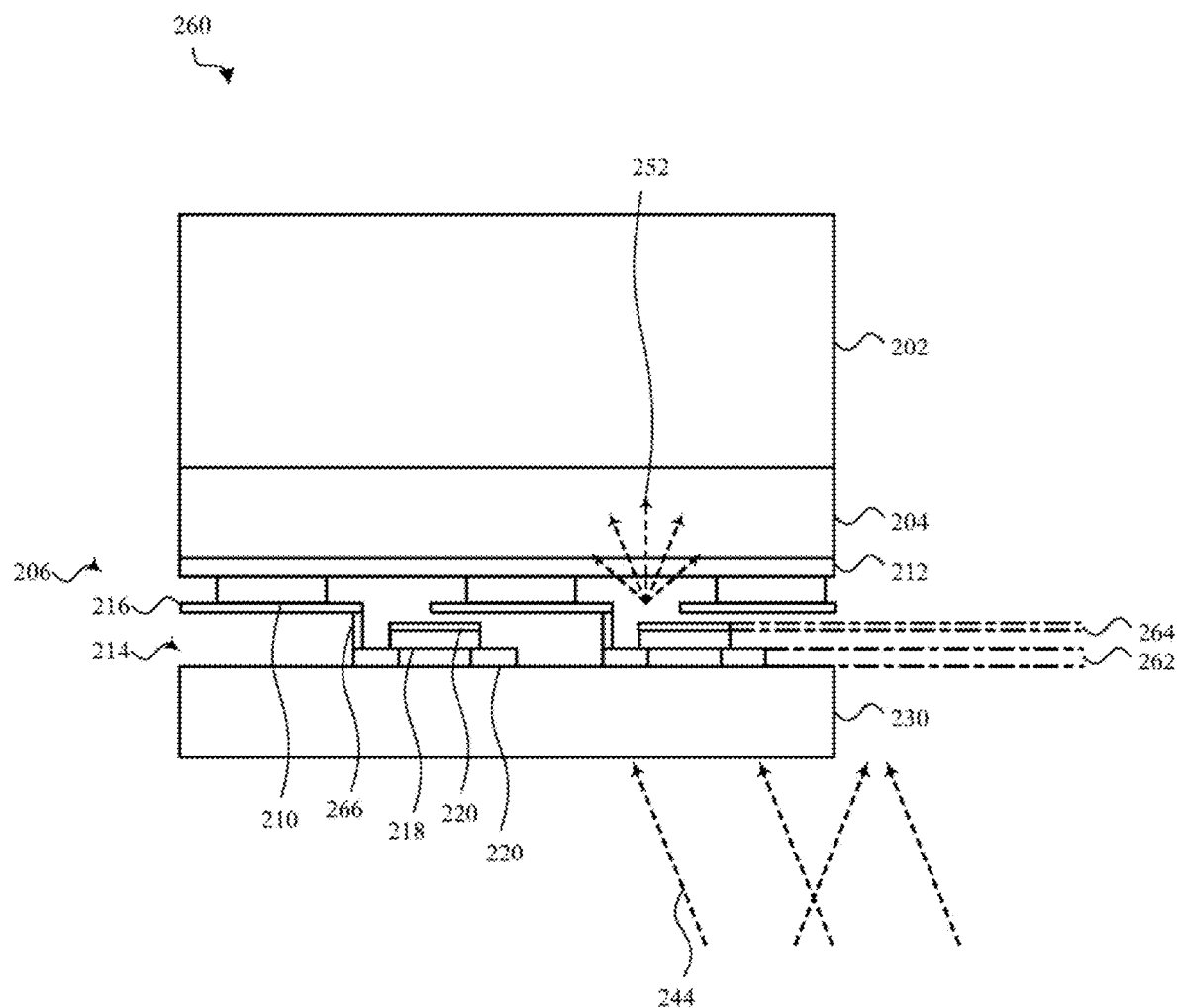

FIG. 2B shows an enlarged portion 270 of the display stack described with reference to FIG. 2A. In particular, FIG. 2B shows an enlarged view of the light-emitting elements 210, anodes 216, transistors 218, and conductors 220 of the display 206.

As shown, the conductors 220 may include a first layer 262 of conductors 220 (or first subset of the conductors 220), a second layer 264 of conductors 220 (or a second subset of the conductors 220), a set of vias 266 that electrically couple the anodes 216 to conductors in the first layer 262 of conductors 220, and/or additional layers or sets of conductors. Each of the transistors 218 may have source and drain terminals that are respectively coupled to a source line or drain line (source/drain lines), and a gate terminal that is coupled to a gate line in the second layer 264 of conductors 220. Each of the light-emitting elements 210, anodes 216, transistors 218, and conductors 220 may be opaque, partially non-transmissive, or laterally non-transmissive to the light 244 emitted by the optical emitter described with reference to FIG. 2A.

In general, elements of the display stack that are opaque, partially non-transmissive, or laterally non-transmissive, or that are made from particular materials (e.g., poly-silicon), may tend to absorb the light 244 emitted by an under-display optical emitter more than other elements. However, any of the elements in the display stack may absorb the light 244. Absorption of the light 244 may alter the way the performance of the elements, and in some cases may permanently degrade the elements. This can lead to distortion of images displayed by the display 206, image sticking, or interruptions in displayed content. However, synchronizing the emissions of the display 206 and under-display optical emitter can improve or eliminate these undesirable effects.

Figure 3:
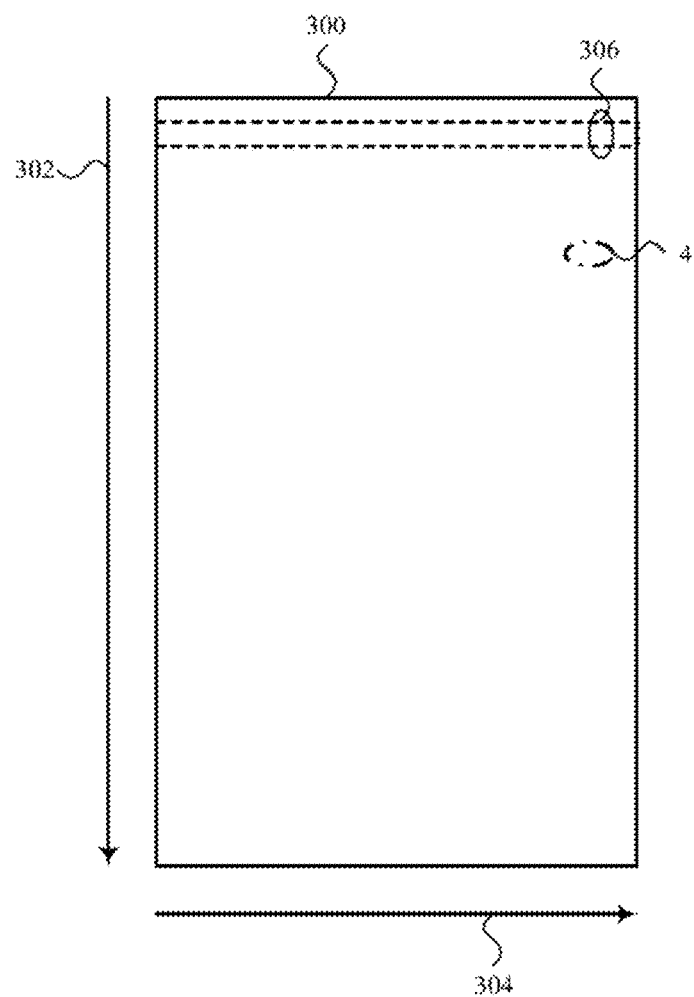
FIG. 3 shows an example emission plan (or line scan plan) for a light-emitting display.

FIG. 3 shows an example emission plan (or line scan plan) for a light-emitting display 300. By way of example, the light-emitting display 300 has an array of pixels extending in a first direction 302 (e.g., in a vertical direction or dimension) and a second direction 304 (e.g., in a horizontal direction or dimension), with the second direction 304 being orthogonal to the first direction 302. The light-emitting display 300 may be refreshed line-by-line, advancing in the first direction 302.

In some embodiments, the light-emitting display 300 may be refreshed during each of a plurality of display frames. A first synchronization signal (e.g., a vertical synchronization (VSync) signal) may indicate the start of a new display frame, and a second synchronization signal (e.g., a horizontal synchronization (HSync) signal) may indicate the refresh of a next line of pixels 306 in the light-emitting display 300. A refresh of a line of pixels 306 may begin with a reset of the line of pixels 306, and may continue with a write of new display frame data to the line of pixels 306. In some embodiments, the refresh of each line of pixels may be delayed with respect to a previous line of pixels.

Figure 4:
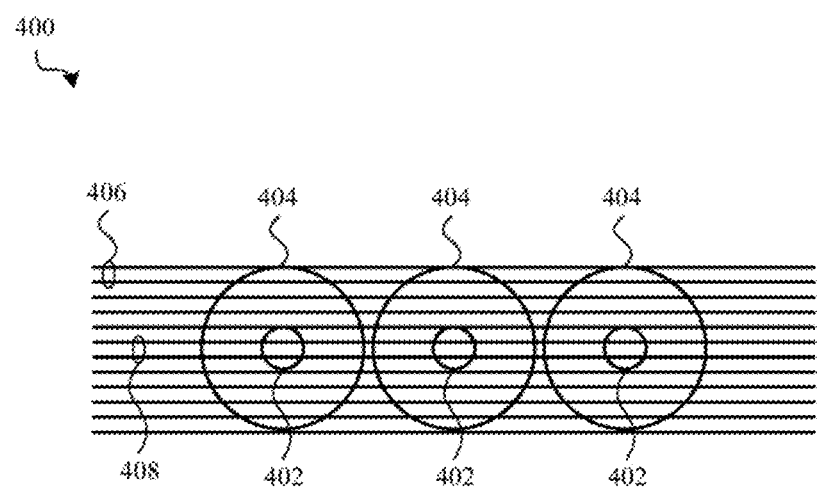
FIG. 4 shows an example plan view of an enlarged portion of the light-emitting display described with reference to FIG. 3, in relation to a set of optical emitters positioned under the display.

FIG. 4 shows an example plan view of an enlarged portion 400 of the light-emitting display described with reference to FIG. 3. The portion 400 of the light-emitting display is shown in relation to a set of optical emitters 402 positioned under the display (i.e., in a configuration that enables the optical emitters to emit through the display).

By way of example, the enlarged portion 400 of the light-emitting display includes three under-display optical emitters 402. Each optical emitter 402 may emit an optical beam 404 that diverges as it approaches various lines of pixels (e.g., lines 406 and 408) in the light-emitting display. In some embodiments, each optical beam 404 may be collimated so that it has a relatively uniform diameter and cross-section as it passes through the light-emitting display. In other embodiments, some or all of the optical beams may not be collimated, and in some cases may be focused, fanned-out, or otherwise shaped.

As shown, an optical beam of an optical emitter may impinge on, and pass through or adjacent, multiple lines of pixels of the light-emitting display. In other embodiments, an optical beam may pass through or adjacent only a single line of pixels. In either case, an optical beam need not (and typically will not) pass through or adjacent all of the pixels in a line of pixels.

Figure 5A:
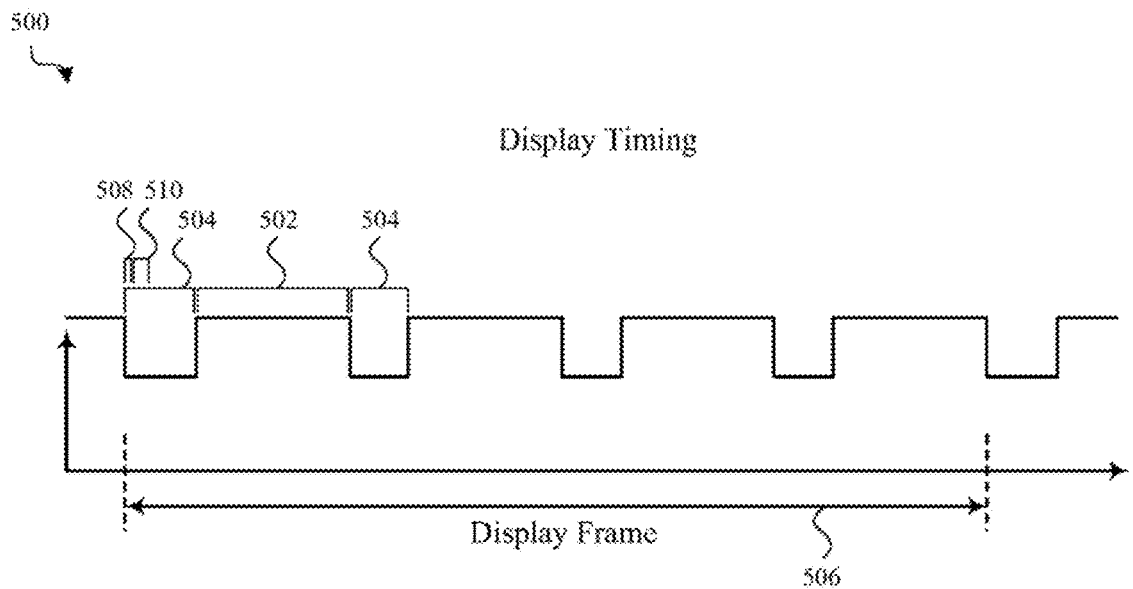
FIG. 5A shows an example illumination timing for the pixels (or light-emitting elements) in a line of pixels (e.g., a horizontal line or row of pixels) in the light-emitting display described with reference to any of FIGS. 1A-4.

FIG. 5A shows an example illumination timing 500 for the pixels (or light-emitting elements) in a line of pixels (e.g., a horizontal line or row of pixels) in the light-emitting display described with reference to any of FIGS. 1A-4. As shown, the pixels may transition through a set of emission periods 502 and emission blanking periods 504 during a display frame 506.

A portion of a first emission blanking period 504 in the display frame 506 may include a reset period 508 (e.g., a first sub-period) and a new display frame data writing period 510 (e.g., a second sub-period). In some embodiments, the duration of the first emission blanking period 504 may be longer than the durations of the other emission blanking periods 504, to account for the inclusion of both a reset period 508 and the new display frame data writing period 510 within the first emission blanking period 504. In other embodiments, the duration of the first emission blanking period 504 may be the same as, or shorter than, the durations of the other emission blanking periods 504 in the display frame 506.

By way of example, the pixels may be modulated between emission and emission blanking periods 502, 504 (or emissive and non-emissive states) multiple times within a single display frame 506. The modulation may be performed, within a display frame 506, using a uniform or non-uniform pulse width modulation (PWM) or duty cycle. Similarly, the modulation may be uniform or non-uniform from one display frame to the next.

Figure 5B:
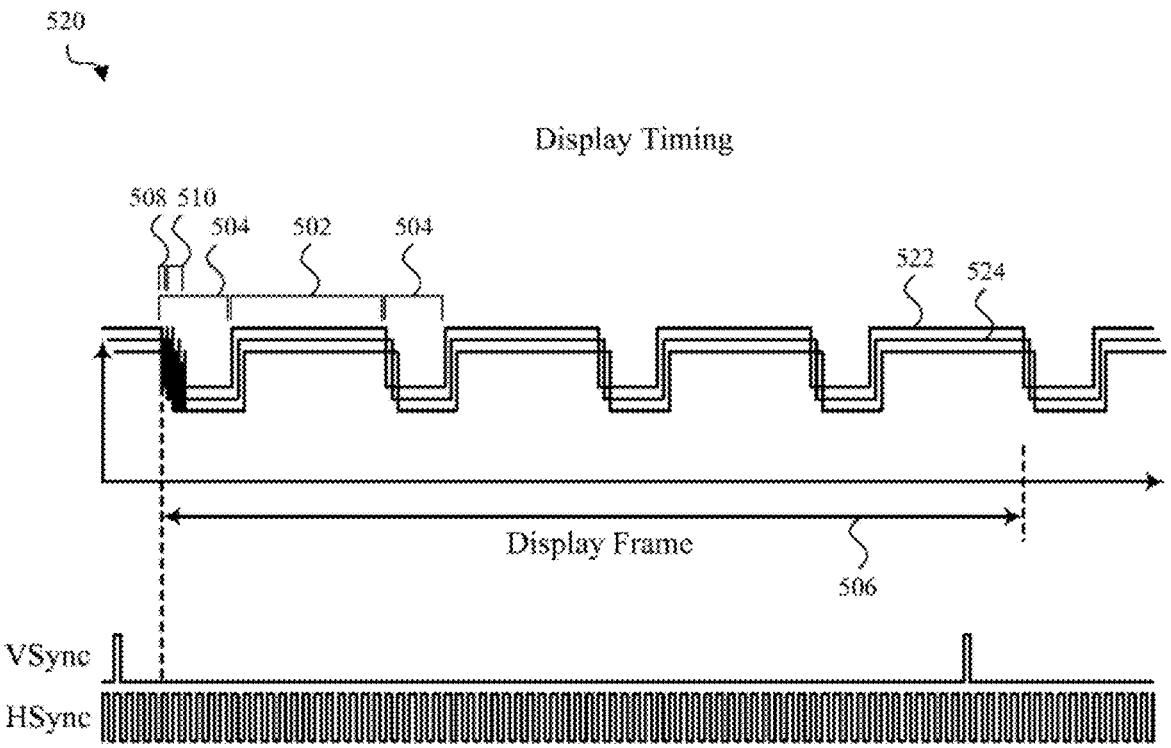
FIG. 5B shows an example set of illumination timings for the pixels (or light-emitting elements) in multiple adjacent lines of pixels (e.g., multiple horizontal lines or rows of pixels) in the light-emitting display described with reference to any of FIGS. 1A-4.

FIG. 5B shows an example set of illumination timings 520 for the pixels (or light-emitting elements) in multiple adjacent lines of pixels (e.g., multiple horizontal lines or rows of pixels) in the light-emitting display described with reference to any of FIGS. 1A-4. As shown, each line of pixels may transition through a set of emission periods 502 and emission blanking periods 504 during a display frame 506, as described with reference to FIG. 5A. However, the timing of a next line (e.g., line 524) may be delayed with respect to the timing of a previous line (e.g., line 522).

FIG. 5B also shows example timings of VSync and HSync signals with respect to the illumination timings for different lines of pixels. The VSync signal may be pulsed once per display frame (e.g., before the display frame begins), and the HSync signal may be pulsed once per line of pixels (e.g., just before the line of pixels is refreshed).

The illumination timings (and emissive and non-emissive periods) described with reference to FIGS. 5A-5B may be considered part of an illumination timing of a light-emitting display. When an optical emitter is positioned behind a light-emitting display, the performance of the light-emitting display and/or the optical emitter may be improved by synchronizing the illumination timing of the light-emitting display (a first illumination timing) and an illumination timing of the optical emitter (a second illumination timing). Similarly, when an optical transceiver is positioned behind a light-emitting display, the performance of the light-emitting display and/or the optical transceiver may be improved by synchronizing the illumination timing of the light-emitting display (a first illumination timing) and an illumination timing (a second illumination timing) or optical sample timing of the optical transceiver.

In some embodiments, the second illumination timing and/or optical sample timing (of the optical emitter or optical transceiver) may be synchronized with the first illumination timing (of the light-emitting display). To achieve such synchronization, one or more synchronization signals used to refresh the light-emitting display, such as the afore-mentioned VSync and HSync signals, or other synchronization signals (e.g., emission blanking or early blanking synchronization signals), may be made available to a processor that controls the optical emitter or optical transceiver. Additionally or alternatively, the synchronization signals used to refresh the light-emitting display may be output to a processor that configures both the light-emitting display and the optical emitter or optical transceiver.

In some embodiments, the first illumination timing (the illumination timing of the light-emitting display) may be synchronized with the second illumination timing and/or optical sample timing of the optical emitter or optical transceiver. To achieve such synchronization, one or more signals used to configure the optical emitter or optical transceiver may be made available to a processor that controls emissions of the light-emitting display. Additionally or alternatively, the signals used to configure the optical emitter or optical transceiver may be output to a processor that configures both the light-emitting display and the optical emitter or optical transceiver. Additionally or alternatively, an optical receiver or transceiver may optically capture back emissions of the display, and may generate one or more synchronization signals from the timing(s) of the capture(s).

FIGS. 6A-6D show an example set of transistors 600 (e.g., TFTs) that may be included in the drive circuitry for a pixel (or light-emitting element) of a light-emitting display. In some embodiments, the transistors shown in FIGS. 6A-6D may be included in the display described with reference to FIGS. 1A-1B, or in the transistors described with reference to FIGS. 2A-2B, or in the pixels described with reference to 3-5B.

The set of transistors 600 includes a first emission TFT 602, a drive TFT 604, and a second emission TFT 606. The transistors 602, 604, 606 may be coupled in series by means of their sources and drains, between a voltage supply line 608 and a light-emitting element 610 (e.g., an OLED). The drive TFT 604 may be disposed between the emission TFTs 602, 606 in a current path formed between the voltage supply line 608 and the light-emitting element 610. The first emission TFT 602 may have a gate driven by an emission control signal (EM Control). The drive TFT 604 may have a gate driven by a data control signal (Data Control). The second emission TFT 606 may have a gate driven by the same emission control signal that drives the gate of the first emission TFT 602. By way of example, each TFT 602, 604, 606 is shown to be a p-type device. Alternatively, each TFT 602, 604, 606 could be an n-type device or other type of device.

Figure 6A:
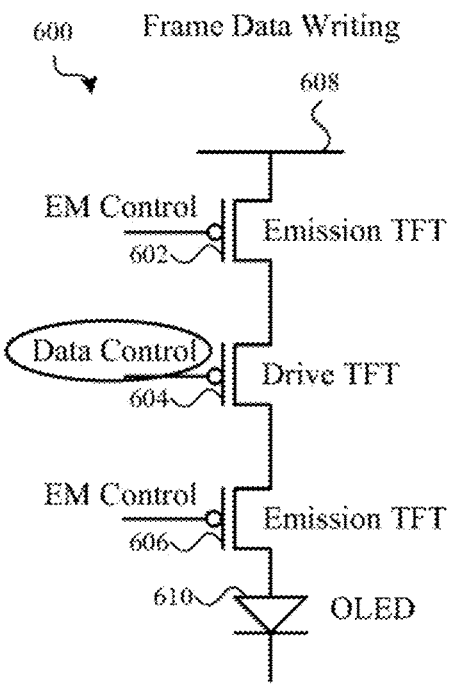
FIGS. 6A-6D show an example set of transistors that may be included in the drive circuit for a pixel (or light-emitting element) in a light-emitting display.
Figure 6B:
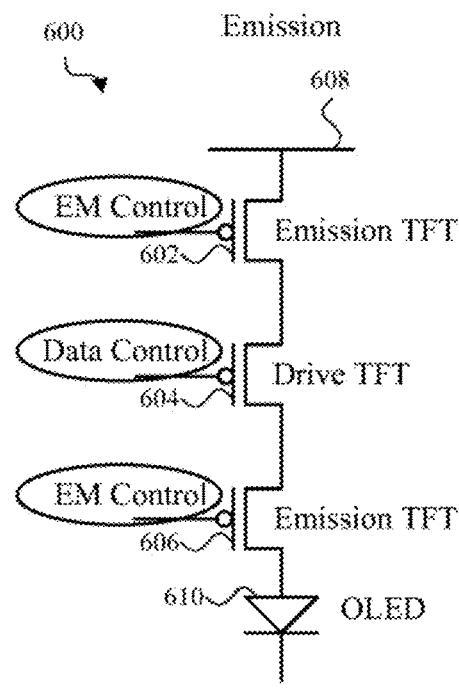
Figure 6C:
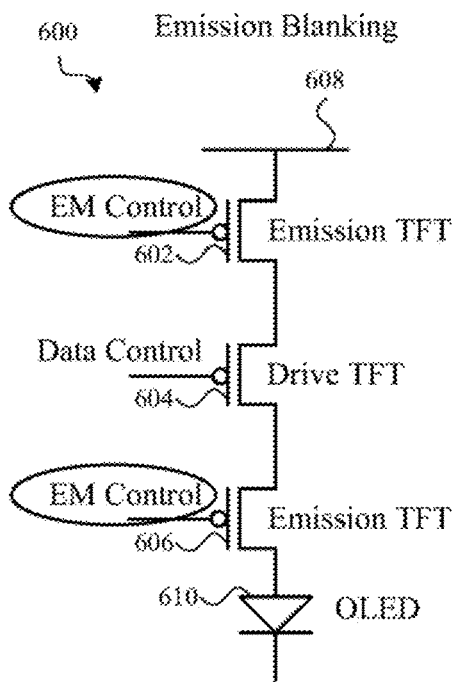
Figure 6D:
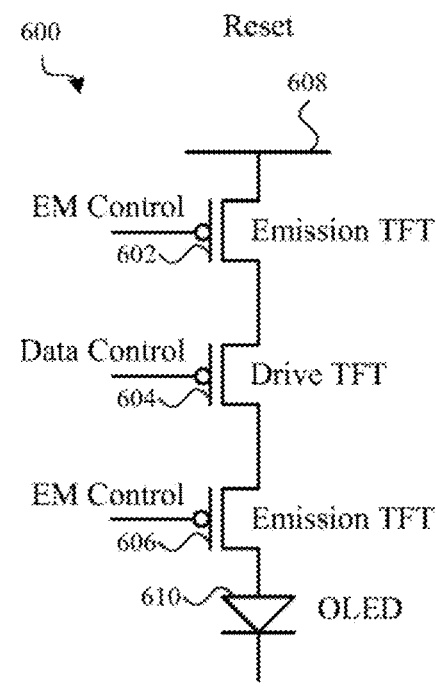

A display frame for a pixel may begin with a new display frame data writing period, during which the Data Control signal is asserted to turn the drive TFT 604 ON while the emission TFTs 602, 606 are turned OFF (see, FIG. 6A, with the encircled Data Control label indicating that the Data Control signal is asserted). After the new display frame writing period, the pixel may be modulated between an emission period (or emissive state) and an emission blanking period (or non-emissive state). The emissive state is shown in FIG. 6B, and involves turning on the emission TFTs 602, 606 while the drive TFT 604 remains ON. The non-emissive state is shown in FIG. 6C, and involves turning OFF the emission TFTs 602, 606 while the drive TFT 604 remains ON, to isolate the drive TFT 604 from the rail voltage/current The pixel may be modulated between the emission and emission blanking periods one or multiple times during a display frame, at a duty cycle determined by a pixel brightness parameter and/or other parameters for the display frame. After a predetermined number of modulations between the emission and emission blanking periods, the pixel may be transitioned to a reset state, in which the emission and drive TFTs 602, 604, 606 are all turned OFF to reset the pixel (see, FIG. 6D). Subsequently, the pixel may be transitioned to a next new frame data writing period, as shown in FIG. 6A, and the sequence of pixel periods (or states) may be repeated. The pixel is in a non-emissive state when its TFTs are transitioned to the states described with reference to each of FIGS. 6A, 6C, and 6D.

The set of transistors 600 may be more or less impacted by the emissions of an under-display optical emitter or transceiver, depending on whether they are in an emissive or non-emissive state, or depending on which of the states shown in FIGS. 6A-6D the set of transistors 600 is in. For example, the set of transistors 600 may be most impacted by under-display emissions when in the frame data writing state described with reference to FIG. 6A, and least impacted by under-display emissions when in the reset state described with reference to FIG. 6D. Furthermore, and in general, the set of transistors 600 (or the images displayed by a display) may be more impacted by under-display emissions when in the emission state described with reference to FIG. 6B, and less impacted by under-display emissions when in the emission blanking state described with reference to FIG. 6C. However, the set of transistors 600 (or the images displayed by a display) may be less impacted by under-display emissions that occur during a last emission period of a display fame (i.e., when the set of transistors 600 is in the state described with reference to FIG. 6B), just before a reset period (i.e., just before the set of transistors 600 transitions to the reset state described with reference to FIG. 6D and are reset). Note that, in many cases, the set of transistors 600 may include more transistors (e.g., 6, 7, 8, or more transistors), and all of these transistors may potentially be impacted by the emissions of an under-display optical emitter or transceiver.

Figure 7A:
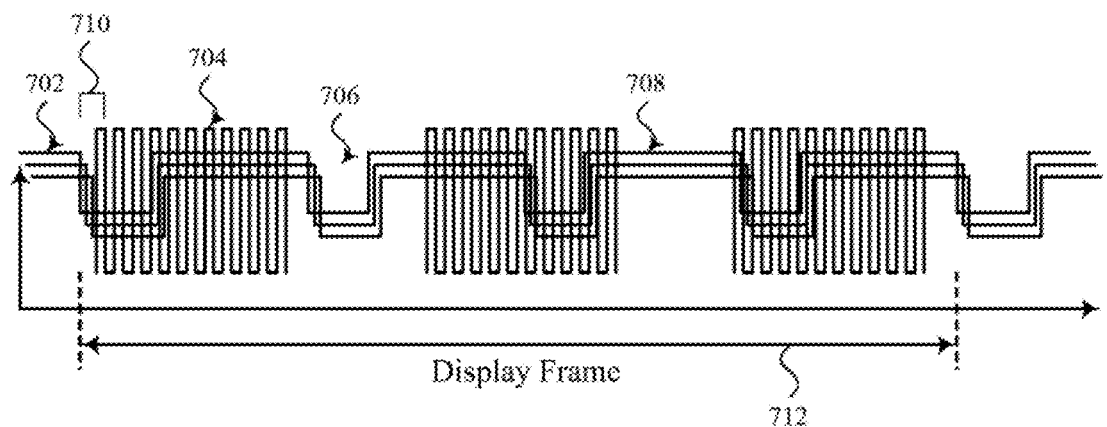
FIGS. 7A-7D illustrate various examples of illumination timings for a light-emitting display and optical emitter.

FIG. 7A shows a first example of illumination timings 700 for a light-emitting display and under-display optical emitter. A first illumination timing 702, of the light-emitting display, may be configured as described with reference to FIGS. 3A-6B. A second illumination timing 704, of the optical emitter, may be configured independently of the first illumination timing 702. As a result, periodic or non-periodic emissions of the optical emitter may occur during some (but not necessarily all) emission periods 708 of the light-emitting display. Periodic or non-periodic emissions of the optical emitter may also occur during some (but not necessarily all) emission blanking periods 706 of the light-emitting display. Also, during different periodic or non-periodic emission periods 708, the optical emitter may emit during different portions of the emission period 708. The seemingly erratic emissions of the optical emitter at least from the perspective of the light-emitting display may interfere with the display's operation and/or a user's experience. For example, variations in whether the optical emitter is or is not emitting during an emission period 708 of the light-emitting display can lead to visibly perceptible changes (e.g., a detectible flicker or change in color) in the display's output. Visibly perceptible changes may be due to changes in a device's overall light output, but more often may be a result of the effects that through-display optical emissions have on the TFTs that drive the light-emitting display. For example, irradiation of TFTs may lead to changes in their physical structure, voltage, current, or other parameters. These changes may be temporary or permanent. As another example, irradiation of a drive TFT (e.g., the drive TFT described with reference to FIGS. 3A-3D) during a new display frame data writing period 710 may lead to changes in the new display frame data that is ultimately written, which can affect the color, intensity, or other parameters of a pixel's output for a display frame 712. As yet another example, prolonged irradiation of TFTs, or irradiation of TFTs at particular times, can lead to permanent changes in the TFTs. These permanent changes may present as image sticking or unwanted image artifacts in portions or all of the surface area of a light-emitting display.

Figure 7B:
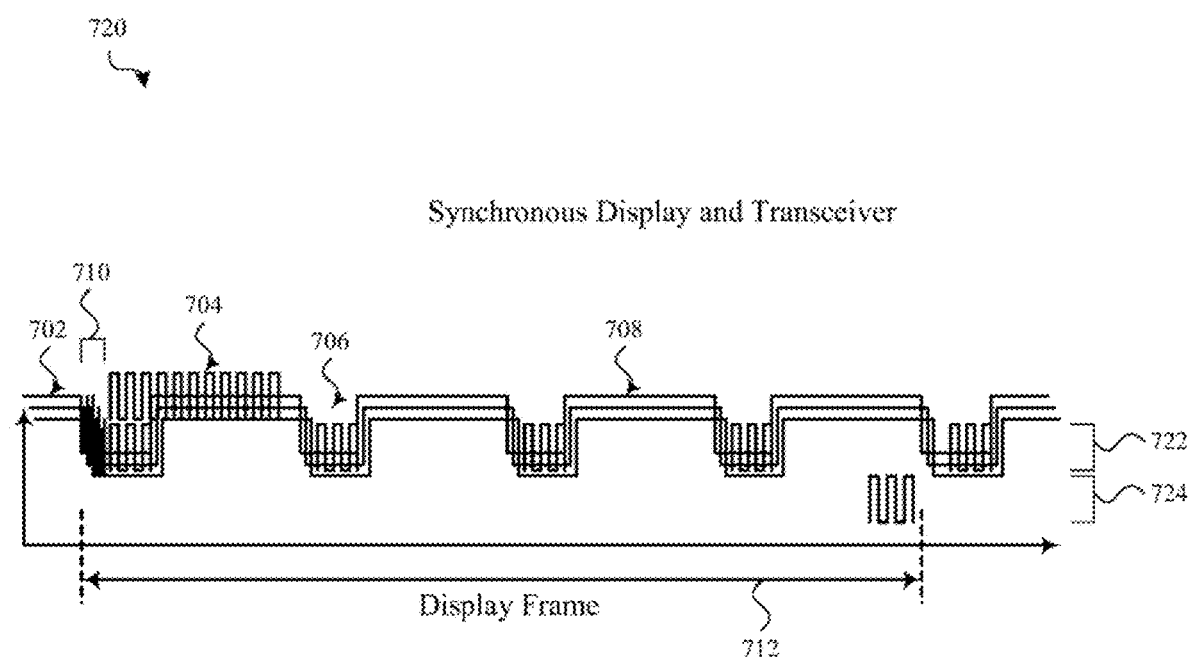
Figure 7C:
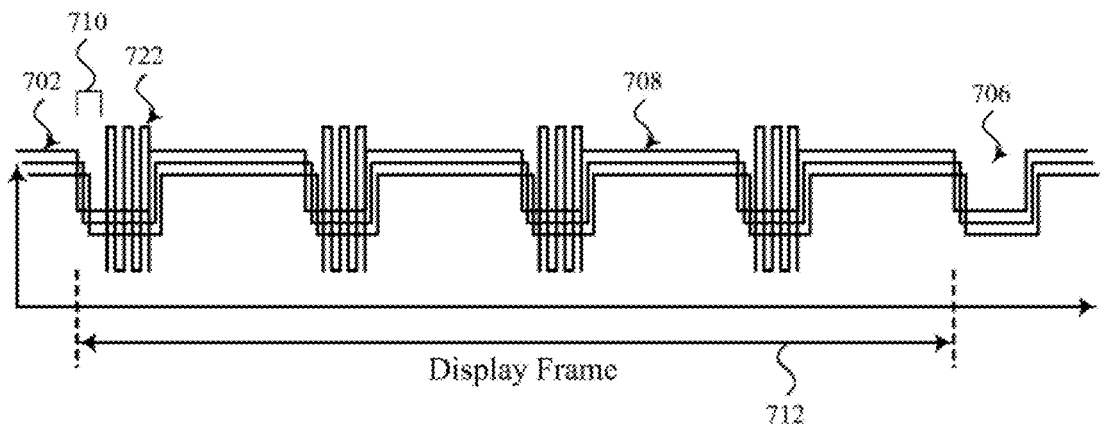
Figure 7D:
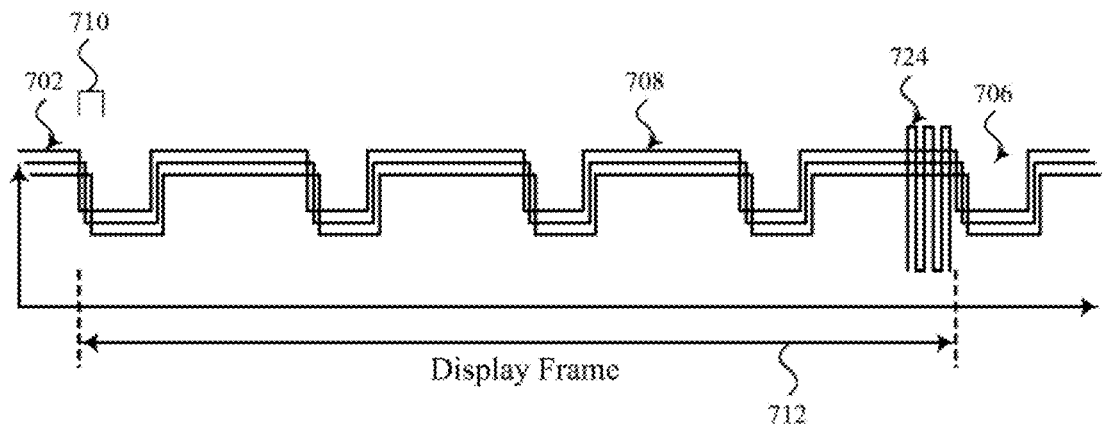

To lessen or eliminate the effects of under-display emissions on a display, the illumination timings of a light-emitting display and under-display optical emitter or transceiver may be synchronized. To this end, FIGS. 7B-7D illustrate various examples of illumination timings for a light-emitting display and optical emitter. More particularly, FIGS. 7B-7D illustrate various synchronized illumination timings 720, 740, 760 for a light-emitting display and optical emitter. In each scenario, the optical emitter is presumed to be positioned under (behind) the light-emitting display, and configured to emit light through the light-emitting display.

FIG. 7B shows a second example of illumination timings 720 for a light-emitting display and optical emitter. A first illumination timing 702, of the light-emitting display, may be configured as described with reference to FIGS. 3A-6B. A second illumination timing 704, of the optical emitter, may be synchronized with the first illumination timing 702.

As shown, a processor may configure the second illumination timing 702 such that the optical emitter is prohibited from emitting light during one or more new display frame data writing periods 710. This synchronization scheme may be referred to as a non-data-writing synchronization scheme. When the optical emitter emits a relatively small optical beam, such that the optical beam only passes through or adjacent one or more pixels in a single line of pixels in the light-emitting display, the processor may configure the second illumination timing 704 such that the optical emitter is prohibited from emitting light during a new display frame data writing period for the line of pixels. However, when the optical beam is larger, such that the optical beam passes through or adjacent one or more pixels in multiples lines of pixels in the light-emitting display, the processor may configure the second illumination timing 704 such that the optical emitter is prohibited from emitting light during the new display frame data writing periods 710 for each of the lines of pixels. This may increase the duration of the window in which the optical emitter may not emit.

The processor may configure the optical emitter to emit at times that are synchronized, or not synchronized, with respect to the first illumination timing of the light-emitting display, so long as the emissions do not occur during the new display frame data writing period(s) 710 of the lines of pixels that intersect, or are adjacent to or near, the optical beam of the optical emitter. In some embodiments, the emissions of the optical emitter may be limited to the remainder of the emission blanking period(s) 706 that include(s) the new display frame data writing period(s) 710 and/or other emission blanking periods 706, or to portions of emission blanking periods 706 that are common to (i.e., aligned) all of the lines of pixels that intersect, or are adjacent to or near, the optical beam of the optical emitter. In some embodiments, the emissions of the optical emitter may occur during emission periods 708 of the pixels that intersect, or are adjacent to or near, the optical beam of the optical emitter. In some embodiments, the emissions of the optical emitter may be confined as further described with reference to FIG. 7C or 7D (and shown as alternative illumination timing 722 or 724). In some embodiments, rather than maintaining a constant peak power across all of the pulses in a pulse train, a non-data writing emission plan could have a variable peak power (e.g., a peak power that i) varies by pulse, ii) is adaptive to the severity of display distortion at different times within and across a display frame, and/or iii) is adaptive to the content of single or multiple display frames).

The second illumination timing 704 illustrated in FIG. 7B may be advantageous, in some embodiments, in that the emissions of the optical emitter do not occur at an often critical time of a display frame 712 (i.e., during a data write).

FIG. 7C shows a third example of illumination timings 740 for a light-emitting display and optical emitter. A first illumination timing 702, of the light-emitting display, may be configured as described with reference to FIGS. 3A-6B. A second illumination timing 722, of the optical emitter, may be synchronized with the first illumination timing 702.

As shown, a processor may configure the second illumination timing 722 such that the optical emitter is limited to emitting light during one or more emission blanking periods 706 in a set of emission blanking periods. This synchronization scheme may be referred to as an emission blanking period synchronization scheme. When the optical emitter emits a relatively small optical beam, such that the optical beam only passes through or adjacent one or more pixels in a single line of pixels in the light-emitting display, the processor may configure the second illumination timing 722 such that the optical emitter is limited to emitting light during one or more emission blanking periods 706 for the line of pixels. However, when the optical beam is larger, such that the optical beam passes through or adjacent one or more pixels in multiples lines of pixels in the light-emitting display, the processor may configure the second illumination timing 722 such that the optical emitter is limited to emitting light during the portions of emission blanking periods 706 that are common to each of the lines of pixels (e.g., in the overlapping portions of emission blanking periods for different lines of pixels). This may decrease the duration of the window in which the optical emitter may emit.

In some embodiments, and due to trapping and relaxation of TFT carrier dynamics, the optical emitter emission window may be trimmed or offset from an exact overlap with emission blanking periods for the light-emitting display.

In some embodiments, the processor may also configure the second illumination timing 722 such that the optical emitter is prohibited from emitting light during one or more new display frame data writing periods 710, as described with reference to FIG. 7B.

The second illumination timing 722 illustrated in FIG. 7C may be advantageous, in some embodiments, in that the emissions of the light-emitting display and optical emitter occur at different times, and the optical emitter's emissions do not directly combine or interfere with the light-emitting display's emissions.

FIG. 7D shows a fourth example of illumination timings 760 for a light-emitting display and optical emitter. A first illumination timing 702, of the light-emitting display, may be configured as described with reference to FIGS. 3A-6B. A second illumination timing 724, of the optical emitter, may be synchronized with the first illumination timing 702.

As shown, a processor may configure the second illumination timing 724 such that the optical emitter is limited to emitting light during a sequentially last emission period 708 in a plurality of emission periods for a display frame 712. This synchronization scheme may be referred to as an end-of-frame synchronization scheme. When the optical emitter emits a relatively small optical beam, such that the optical beam only passes through or adjacent one or more pixels in a single line of pixels in the light-emitting display, the processor may configure the second illumination timing 724 such that the optical emitter is limited to emitting light during a sequentially last emission period 708 for the line of pixels. However, when the optical beam is larger, such that the optical beam passes through or adjacent one or more pixels in multiples lines of pixels in the light-emitting display, the processor may configure the second illumination timing 724 such that the optical emitter is limited to emitting light during a portion of a sequentially last emission period 708 that is common to each of the lines of pixels (e.g., in an overlapping portion of the sequentially last emission periods 708 for different lines of pixels). This may decrease the duration of the window in which the optical emitter may emit.

The second illumination timing 724 illustrated in FIG. 7D may be advantageous, in some embodiments, in that the sequentially last emission period 708 of a display frame 712 is typically immediately followed by a reset period, as described with reference to FIGS. 3D and 6A. Thus, at least transient effects that the optical emitter's emissions may have on display TFTs may be cleared relatively soon after the optical emitter's emission(s).

In all of the synchronization schemes described in FIGS. 7B-7D, synchronization signals may be received from a display processor (e.g., a display driver), an optical emitter/transceiver processor (e.g., an emitter/transceiver driver), and/or a system processor. Synchronization signals may include a VSync signal, HSync signal, display frame rate, display emission blanking period window, emitter location information, and/or various time delay information. In some cases, a synchronization scheme may be statically or dynamically determined for (or by) an electronic device, based on optical emitter parameters such as an irradiance level of the optical emitter, a spectrum in which the optical emitter emits, or a beam profile of the optical emitter, and/or based on light-emitting display parameters such as a display frame rate, emission blanking period window duration, brightness, or contrast. Additionally or alternatively, an optical receiver or transceiver may optically capture back emissions of a display, and may generate one or more synchronization signals from the timing(s) of the capture(s).

Figure 8:
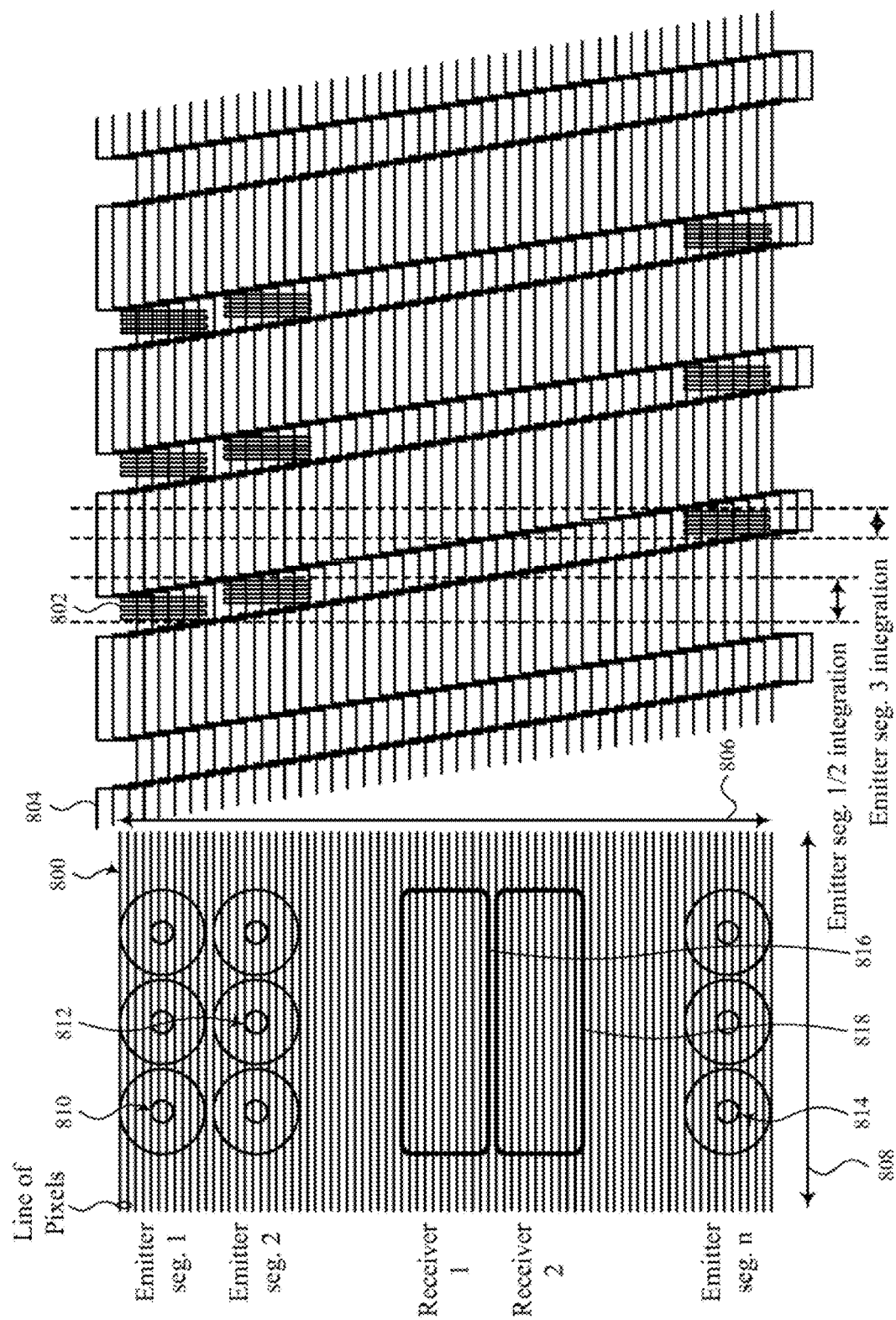
FIG. 8 illustrates an optical transceiver disposed under a light-emitting display, and the emission patterns (or illumination timings) of the optical transceiver and different lines of pixels of the light-emitting display.

FIG. 8 illustrates an optical transceiver disposed under a light-emitting display 800, and the emission patterns (or illumination timings 802, 804) of the optical transceiver and different lines of pixels of the light-emitting display 800.

The light-emitting display 800 may have a first dimension 806 and a second dimension 808, with the second dimension 808 orthogonal to the first dimension 806. The light-emitting display 800 may include a plurality (or array) of pixels that arranged in lines, with each line of pixels being oriented parallel to the second dimension 808. The lines of pixels may be refreshed line-by-line, in accordance with an emission plan that advances to a next line by moving in the first dimension 806.

The optical transceiver may include a number of optical emitters 810, 812, 814 and a number of optical receivers 816, 818. By way of example, FIG. 8A shows an optical transceiver that includes at least nine optical emitters 810, 812, 814 and at least two optical receivers 816, 818. In other embodiments, an optical transceiver may include more or fewer optical emitters or optical receivers.

Optical emitters that overlap the same lines of pixels may be operated in sync or out-of-sync with each other. Likewise, optical emitters that have different positions with respect to the first dimension 806 (e.g., when the first dimension 806 is a vertical dimension, first and second optical emitters 810, 812 that are aligned vertically) may be operated in sync or out-of-sync. Synchronous operation may shrink the emission window for the optical emitters 810, 812, given that the emission patterns for different lines of pixels may be shifted in time. For example, a condition that the synchronized optical emitters 810, 812 need to limit their emissions to emission blanking periods of the lines of pixels through which the optical emitters 810, 812 emit tends to narrow the duration of an emission period for the synchronized optical emitters 810, 812.

Optical emitters that are operated at the same time—whether synchronously, or with overlapping emissions—may have aligned or partially aligned modulation phases (as configured by a processor). Aligned or partially aligned modulation phases may enable the optical emitters to provide simultaneous and predictable illumination. Alternatively, a processor may be configured to modulate different optical emitters 812, 814—operated at the same time—at different frequencies and/or phases. Modulating different optical emitters 812, 814 differently enables an optical receiver 816 or 818 to generate a single output, which output may be demodulated (e.g., by a demodulator), so that a processor can separately characterize reflections, scatter, and so on of the light emitted by different optical emitters 812, 814.

In some embodiments, an optical receiver 816 or 818 may integrate light that is received during different integration windows within a display frame. For example, an optical receiver 816 or 818 may be configured to provide a first integration window (emitter seg. 1/2 integration window) that enables the optical receiver 816 or 818 to receive photons of light emitted by first and second rows of optical emitters 810, 812, which light is reflected or scattered toward the optical receiver 816 or 818. The optical receiver 816 or 818 may be further configured to provide a second integration window (emitter seg. 3 integration window) that enables the optical receiver 816 or 818 to receive photons of light emitted by a third row of optical emitters 814, which light is reflected or scattered toward the optical receiver 816 or 818.

Each optical emitter 810, 812, 814 may be variously configured as a vertical-cavity surface-emitting laser (VCSEL), a vertical external-cavity surface-emitting laser (VECSEL), a quantum-dot laser (QDL), a quantum cascade laser (QCL), an edge-emitting laser (EEL), or a light-emitting diode (LED) (e.g., an organic LED (OLED), a resonant-cavity LED (RC-LED), a micro LED (mLED), a superluminescent LED (SLED), or an edge-emitting LED), and so on. In some embodiments, one or more of the optical emitters 810, 812, 814 may be configured as an array of such devices (e.g., an array of laser or LED devices). Each optical receiver 816, 818 may be variously configured as a photodetector, an avalanche photodetector (APD), a single-photon avalanche detector (SPAD), a complimentary metal-oxide semiconductor (CMOS) image sensor (CIS), and so on. In some embodiments, one or more of the optical receivers 816, 818 may be configured as an array of such devices (e.g., an array of photodetectors, etc.).

Figure 9:
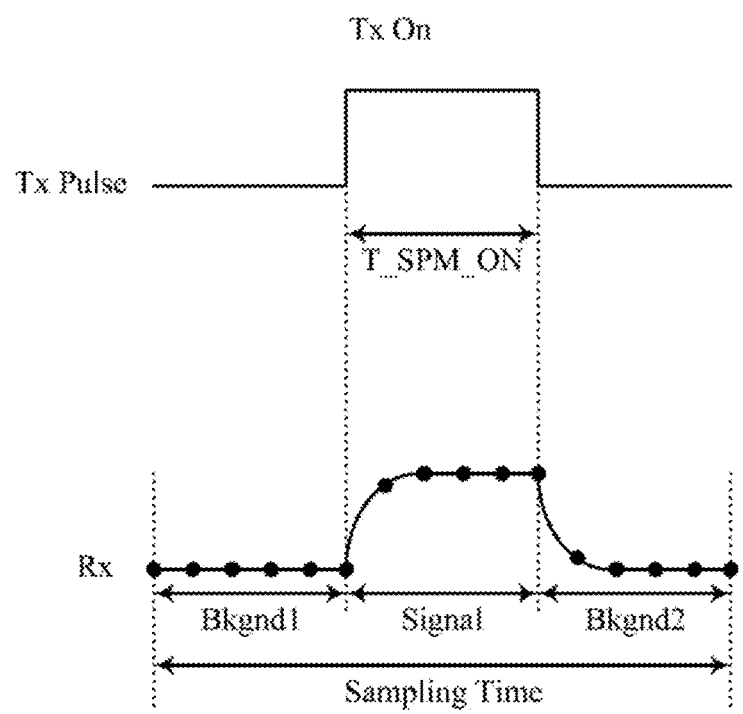
FIG. 9 shows an example operation of an optical emitter and optical receiver included in an optical transceiver.

FIG. 9 shows an example operation of an optical emitter and optical receiver included in an optical transceiver. As shown, the optical emitter may be pulsed during an emission period of the optical emitter. The optical emitter may be pulsed once or multiple times during a display frame, or during a particular emission period during a display frame for a period T SPM ON. In contrast, the optical receiver may be operated continuously, or for a period of time (Sampling Time) that begins before, and ends after, the emission period of the optical emitter. In this manner, a processor may analyze an output of the optical receiver to characterize optical noise. For example, the optical receiver may receive a first average amount of background light (Bkgnd1) prior to the optical emitter's emission period, and receive a second average amount of background light (Bkgnd2) subsequent to the optical emitter's emission period. A processor may subtract the amount of background light from light samples generated by the optical receiver during a sample period (or from an amount of light integrated by the optical receiver during the sample period). The sample period may correspond to the emission period of the optical emitter, and may be aligned with or offset from the emission period of the optical emitter. In some cases, a processor may subtract an average of the background light from the light samples (or Signal) obtained from the optical receiver during the sample period (e.g., Signal−(Bkgnd1+Bkgnd2)/2).

Figure 10:
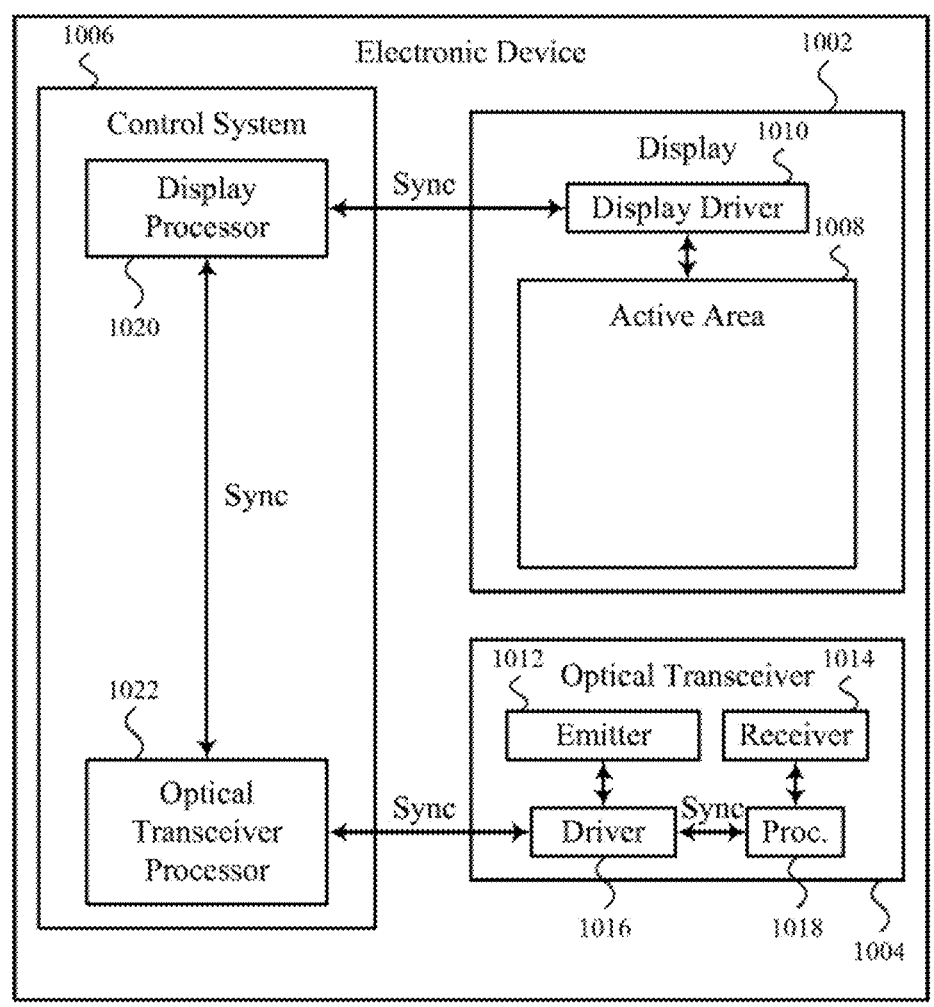
FIG. 10 shows an electronic device including a light-emitting display, an optical transceiver, and a control system.

FIG. 10 shows an electronic device 1000 including a light-emitting display 1002, an optical transceiver 1004, and a control system 1006. The light-emitting display 1002 may include an active area 1008, which active area 1008 may include an array of pixels. The pixels may include LEDs, OLEDs, or other types of light-emitting elements. The light-emitting display 1002 may also include a display driver 1010, which display driver 1010 writes data to, controls, and in some cases reads data from the pixels of the light-emitting display 1002. The optical transceiver 1004 may include at least one optical emitter 1012, an optical receiver 1014, and a driver 1016. The optical emitter 1012 may be positioned to emit light at least one of through or adjacent at least one pixel of the light-emitting display 1002, and the optical receiver 1014 may be positioned to receive light at least one of through or adjacent at least one pixel of the light-emitting display 1002. The driver 1016 may provide synchronization signals to the optical emitter 1012 and the optical receiver 1014. In some cases, the driver 1016 may indirectly provide synchronization signals to the optical receiver 1014—e.g., by providing synchronization signals to a control circuit and/or processor 1018, which control circuit and/or processor 1018 may define integration periods for the optical receiver 1014.

The control system 1006 may include a display processor 1020 and an optical transceiver processor 1022, and in some cases may be implemented as an SoC). The display processor 1020 may be configured to output timing information (e.g., synchronization signals, or instructions for generating synchronization signals) to the light-emitting display 1002. The display processor 1020 may also output some or all of the timing information to the optical transceiver processor 1022. The timing information provided to the optical transceiver processor 1022 may define or characterize one or more of: at least one new display frame data writing period for one or more pixels; a set of emission blanking periods for one or more pixels (e.g., for a display frame); a plurality of emission periods for one or more pixels (e.g., for a display frame); a duty cycle for modulating between emission periods and emission blanking periods of a display frame; a vertical synchronization signal; a horizontal synchronization signal; and so on.

The optical transceiver processor 1022 may be configured to cause the optical transceiver 1004 to emit or receive light in synchronization with the timing information output by the display processor 1020 (e.g., by transmitting synchronization signals, or instructions for generating synchronization signals, to the driver 1016).

Figure 11:
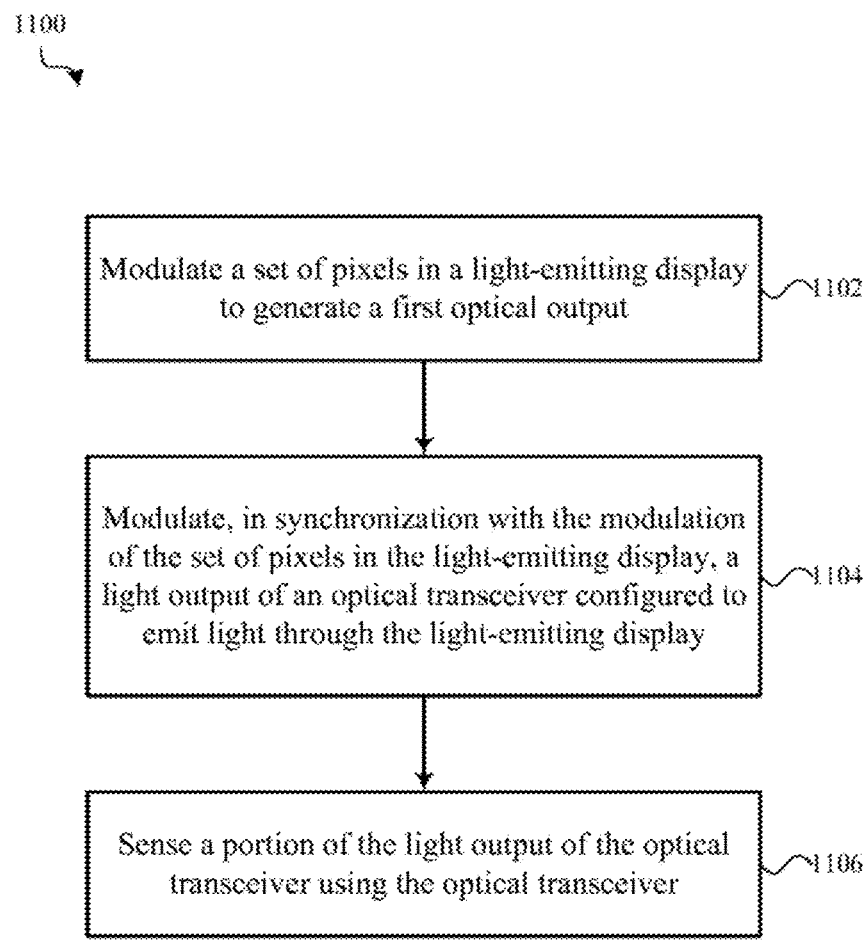
FIG. 11 shows an example of a sensing method that uses an under-display optical transceiver.

FIG. 11 shows an example of a sensing method 1100 that uses an under-display optical transceiver. The method 1100 may be performed by any of the processors or control systems described herein.

At block 1102, the method 1100 may include modulating a set of pixels in a light-emitting display to generate a first optical output. The first optical output may be an image, a series of images, or another form of optical output.

At block 1104, the method 1100 may include modulating, in synchronization with the modulation of the set of pixels in the light-emitting display, a light output of an optical transceiver configured to emit light through the light-emitting display. The light output of the optical transceiver may include one or more of flood illumination, structured illumination, an optical communication, and so on. The light output of the optical transceiver may be generated by one or more optical emitters of the optical transceiver.

At block 1106, the method 1100 may include sensing a portion of the light output of the optical transceiver using the optical transceiver. The sensing may be performed by one or more optical receivers of the optical transceiver.

In some embodiments of the method 1100, the optical transceiver may include a first optical emitter, a second optical emitter, and an optical receiver, and the method may further include aligning a modulation phase of the first optical emitter and the second optical emitter. In some cases, the method 1100 may include integrating a portion of the light emitted by the first optical emitter and the second optical emitter at the optical receiver.

In some embodiments, the optical transceiver may include a first optical emitter, a second optical emitter, and an optical receiver, and the method 1100 may further include modulating the first optical emitter and the second optical emitter at different frequencies and different phases. In some cases, the method 1100 may include sensing a portion of the light emitted by the first optical emitter and the second optical emitter at the optical receiver, outputting, from the optical receiver, a signal corresponding to the portion of the light sensed at the optical transceiver; and demodulating the signal to determine a sensed portion of the light emitted by the first optical emitter and a sensed portion of the light emitted by the second optical emitter.

In some embodiments, the method 1100 may include changing the modulation of the light output of the transceiver in response to a change in the modulation of the set of pixels in the light-emitting display. For example, a display processor may modulate a set of pixels differently in response to an ambient lighting condition, image content, and so on. In response to such a change in modulation, an optical transceiver processor may change the modulation of the transceiver so that its light output and/or sensing remains synchronized with light output of the light-emitting display.

Figure 12A:
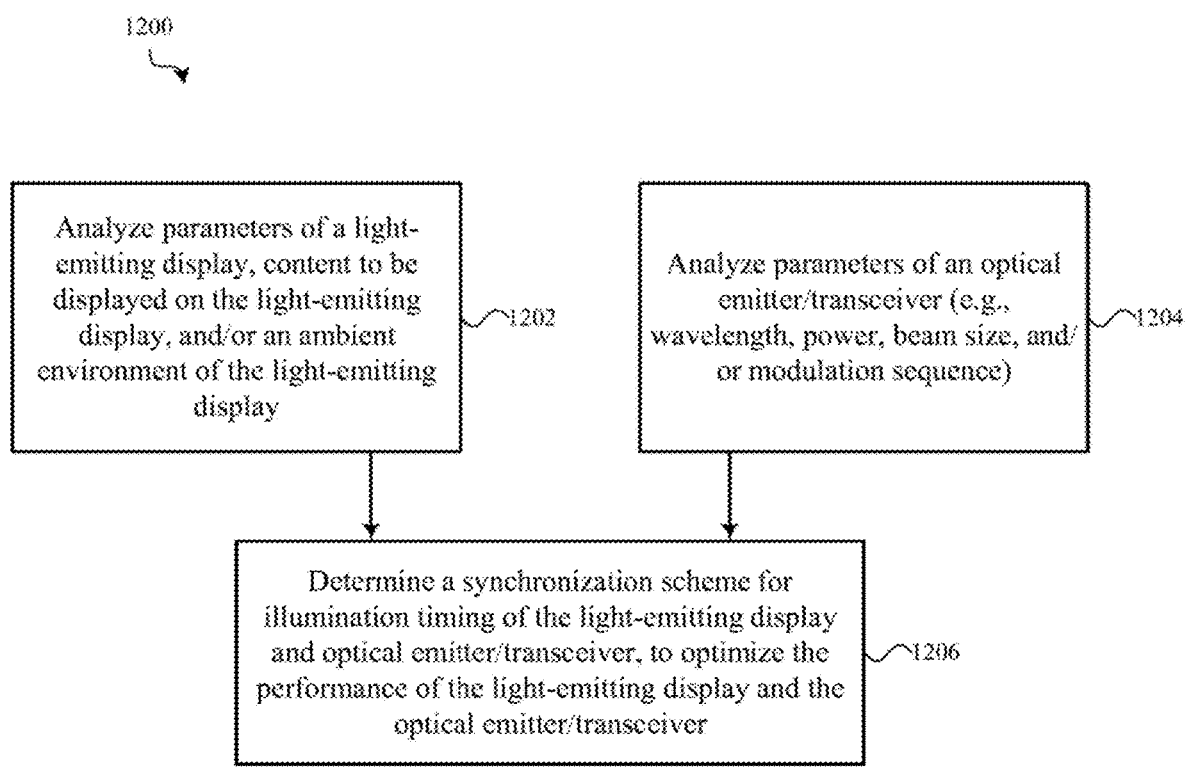
FIGS. 12A-12C illustrate various methods for synchronizing the illumination timing of a light-emitting display and an under-display optical emitter or optical transceiver.
Figure 12B:
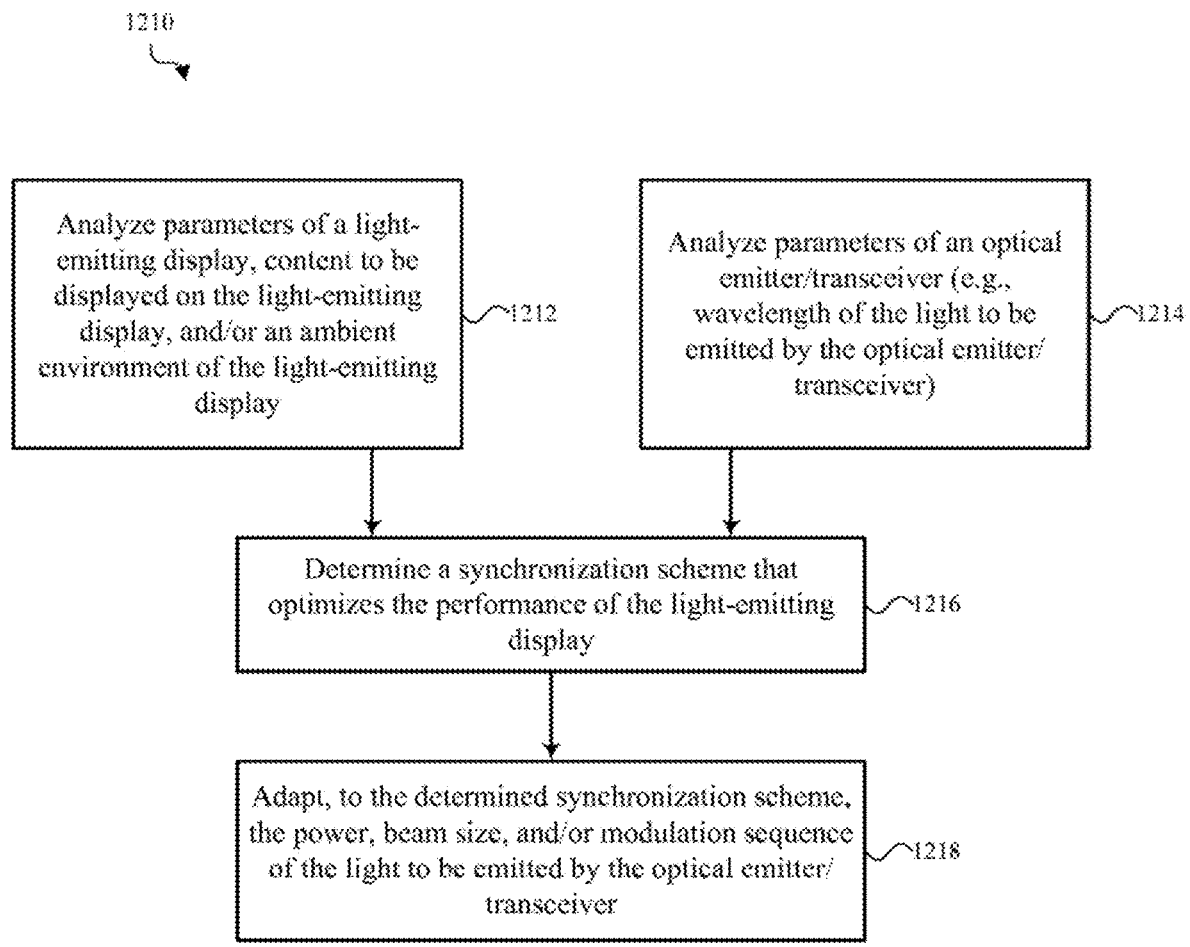
Figure 12C:
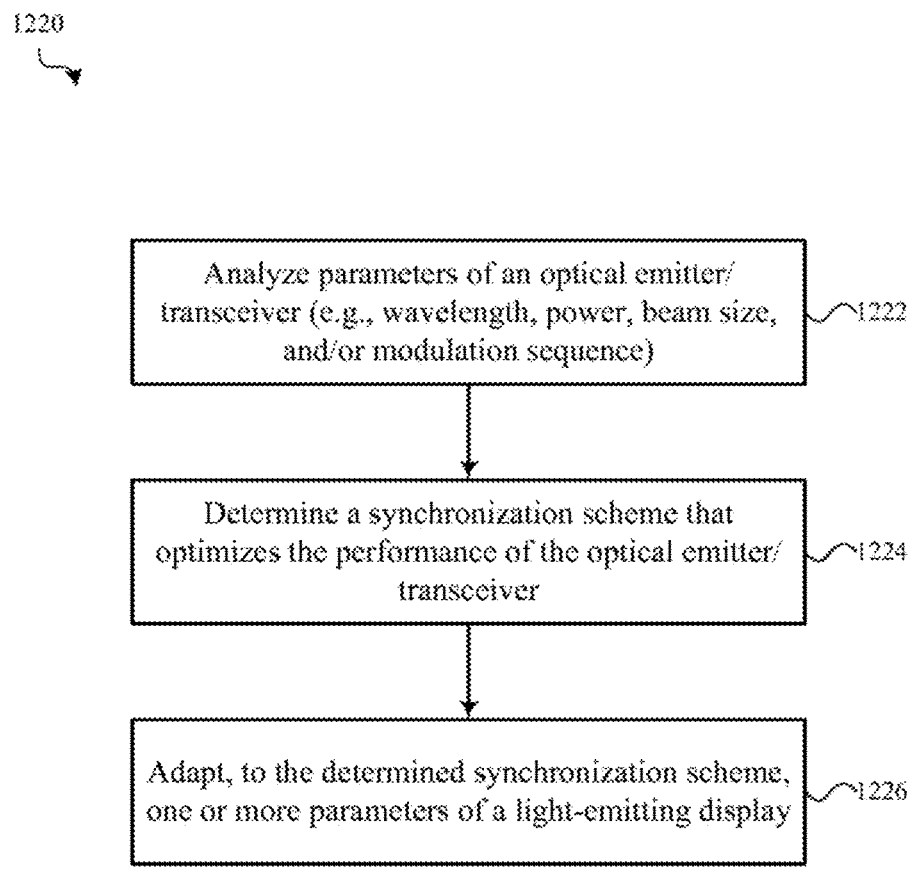

FIGS. 12A-12C illustrate various methods for synchronizing the illumination timing of a light-emitting display and an under-display optical emitter or optical transceiver. As shown in the method 1200 of FIG. 12A, the illumination timing of the light-emitting display and optical emitter/transceiver may be determined in response to a processor analyzing 1) parameters of the light-emitting display, content to be displayed on the light-emitting display, and/or an ambient environment of the light-emitting display (at block 1202), and 2) parameters of the optical emitter/transceiver, such as a wavelength, power, beam size, and/or modulation sequence of the light to be emitted by the optical emitter/transceiver (at block 1204), and determining a synchronization scheme that optimizes the performance of the light-emitting display and the optical emitter/transceiver (at block 1206).

As shown in the method 1210 of FIG. 12B, the illumination timing of the light-emitting display and optical emitter/transceiver may also be determined in response to a processor analyzing 1) parameters of the light-emitting display, content to be displayed on the light-emitting display, and/or an ambient environment of the light-emitting display (at block 1212), and 2) parameters of the optical emitter/transceiver, such as a wavelength of the light to be emitted by the optical emitter/transceiver (at block 1214), and determining a synchronization scheme that optimizes the performance of the light-emitting display (at block 1216). The processor may then adapt, to the synchronization scheme, the power, beam size, and/or modulation sequence of the light to be emitted by the optical emitter/transceiver (at block 1218).

As shown in the method 1220 of FIG. 12C, the illumination timing of the light-emitting display and optical emitter/transceiver may be determined in response to a processor analyzing parameters of the optical emitter/transceiver, such as a wavelength, power, beam size, and/or modulation sequence of the light to be emitted by the optical emitter/transceiver (at block 1222), and determining a synchronization scheme that optimizes the performance of the optical emitter/transceiver (at block 1224). The processor may then adapt parameters of the light-emitting display (at block 1226).

The synchronization between a light-emitting display and optical emitter/transceiver may also be undertaken in other ways, by configuring or changing the illumination timing of a light-emitting display and/or or the illumination timing of an under-display optical emitter or transceiver. For example, a processor may be configured to synchronize a first illumination timing of a light-emitting display (e.g., display content, frame rate, emission blanking, etc.) and a second illumination timing of an under-display optical emitter or transceiver, by adaptively configuring the first illumination timing and/or the second illumination timing to reduce effects of the light emitted by the optical emitter/transceiver on the light-emitting display.

Figure 13:
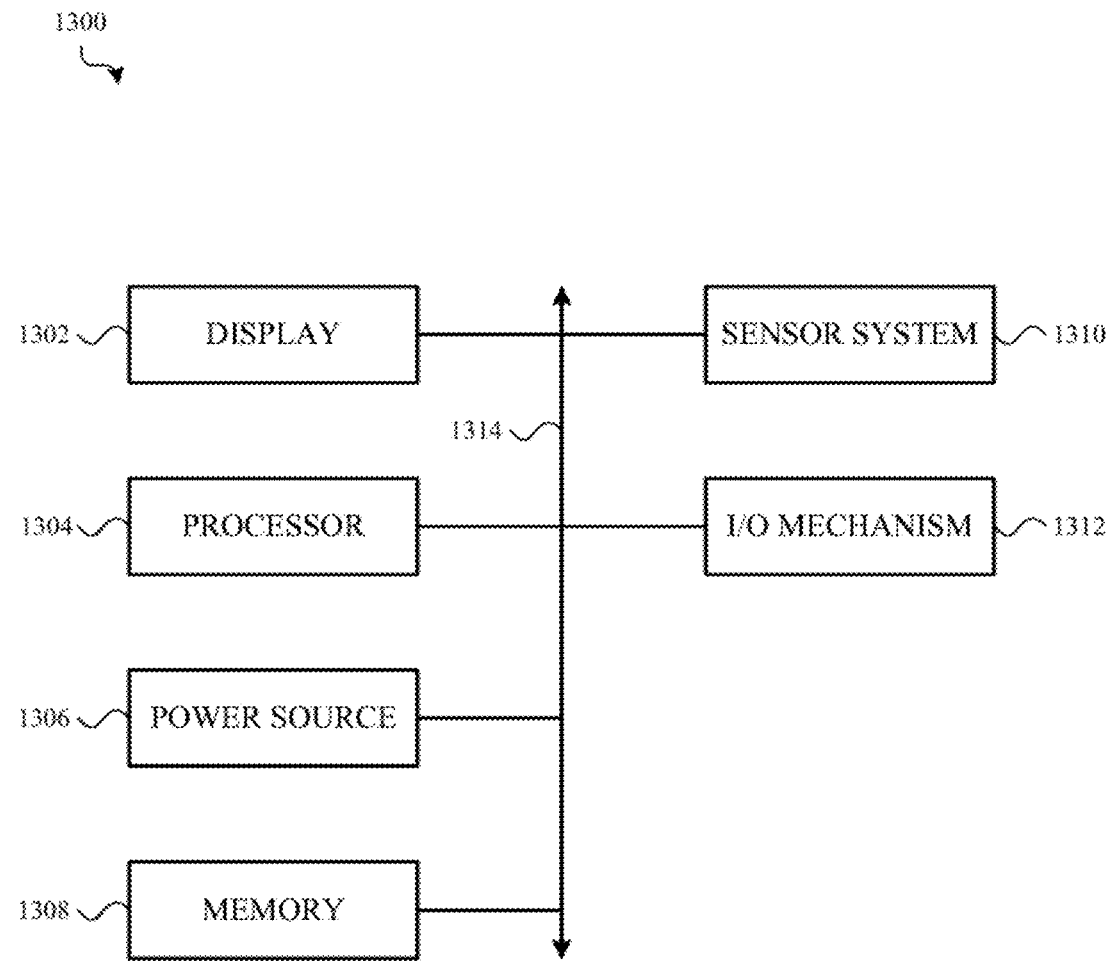
FIG. 13 shows an example electrical block diagram of an electronic device.

FIG. 13 shows a sample electrical block diagram of an electronic device 1300, which electronic device may in some cases take the form of the device described with reference to FIGS. 1A and 1B and/or have a display stack or under-display optical emitter or transceiver as described with reference to FIGS. 1A-10. The electronic device 1300 may include a display 1302 (e.g., a light-emitting display), a processor 1304, a power source 1306, a memory 1308 or storage device, a sensor system 1310, or an input/output (I/O) mechanism 1312 (e.g., an input/output device, input/output port, or haptic input/output interface). The processor 1304 may control some or all of the operations of the electronic device 1300. The processor 1304 may communicate, either directly or indirectly, with some or all of the other components of the electronic device 1300. For example, a system bus or other communication mechanism 1314 can provide communication between the display 1302, the processor 1304, the power source 1306, the memory 1308, the sensor system 1310, and the I/O mechanism 1312.

The processor 1304 may be implemented as any electronic device capable of processing, receiving, or transmitting data or instructions, whether such data or instructions is in the form of software or firmware or otherwise encoded. For example, the processor 1304 may include a microprocessor, a central processing unit (CPU), an ASIC, a digital signal processor (DSP), a controller, or a combination of such devices. As described herein, the term "processor" is meant to encompass a single processor or processing unit, multiple processors, multiple processing units, or other suitably configured computing element or elements.

It should be noted that the components of the electronic device 1300 can be controlled by multiple processors. For example, select components of the electronic device 1300 (e.g., the sensor system 1310) may be controlled by a first processor and other components of the electronic device 1300 (e.g., the display 1302) may be controlled by a second processor, where the first and second processors may or may not be in communication with each other.

The power source 1306 can be implemented with any device capable of providing energy to the electronic device 1300. For example, the power source 1306 may include one or more batteries or rechargeable batteries. Additionally or alternatively, the power source 1306 may include a power connector or power cord that connects the electronic device 1300 to another power source, such as a wall outlet.

The memory 1308 may store electronic data that can be used by the electronic device 1300. For example, the memory 1308 may store electrical data or content such as, for example, audio and video files, documents and applications, device settings and user preferences, timing signals, control signals, and data structures or databases. The memory 1308 may include any type of memory. By way of example only, the memory 1308 may include random access memory, read-only memory, Flash memory, removable memory, other types of storage elements, or combinations of such memory types.

The electronic device 1300 may also include one or more sensor systems 1310 positioned almost anywhere on the electronic device 1300. However, at least one optical transceiver may be positioned under the display 1302, and may be configured to transmit and receive light through the display 1302. The sensor system(s) 1310 may be configured to sense one or more types of parameters, such as but not limited to, light; touch; force; heat; movement; relative motion; biometric data (e.g., biological parameters) of a user; proximity of an object; depth of an object; and so on. By way of example, the sensor system(s) 1310 may include a heat sensor, a position sensor, a light or optical sensor (e.g., an optical transceiver), an accelerometer, a pressure transducer, a gyroscope, a magnetometer, a health monitoring sensor, and so on. Additionally, the one or more sensor systems 1310 may utilize any suitable sensing technology, including, but not limited to, capacitive, ultrasonic, resistive, optical, ultrasound, piezoelectric, and thermal sensing technology.

The I/O mechanism 1312 may transmit or receive data from a user or another electronic device. The I/O mechanism 1312 may include the display 1302, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1312 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data (e.g., the presence and/or proximity of a user to a device, a user's fingerprint, and so on). The present disclosure contemplates that, in some instances, this gathered data may include personal information data that uniquely identifies or can be used to identify, locate, or contact a specific person. Such personal information data can include demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to activate or deactivate various functions of the user's device, or gather performance metrics for the user's device or the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A device, comprising:
   a light-emitting display operated in accord with a display frame having a first set of periodic emission periods interspersed with a set of periodic emission blanking periods;
   an optical emitter having a second set of periodic emission periods during the display frame, the optical emitter positioned behind the light-emitting display and configured to emit light through the light-emitting display; and
   at least one processor configured to synchronize the first set of periodic emission periods and the second set of periodic emission periods, causing the second set of periodic emission periods to occur during,
     the set of periodic emission blanking periods; or
     a sequentially last emission period in the first set of periodic emission periods.

2. The device of claim 1, further comprising:
   an optical receiver positioned behind the light-emitting display and configured to receive light through the light-emitting display; wherein,
   the processor is configured to synchronize the first set of periodic emission periods and an optical sample timing of the optical receiver.

3. The device of claim 1, wherein:
   the light-emitting display has a vertical dimension and a horizontal dimension;
   the light-emitting display has an illumination timing; and
   the first set of periodic emission periods is synchronized with at least one of a vertical synchronization signal or a horizontal synchronization signal of the illumination timing.

4. The device of claim 1, wherein:
   the first set of periodic emission periods is modulated with a set of emission blanking periods in accordance with a pulse width modulation.

5. The device of claim 1, wherein:
   the light-emitting display has an illumination timing; and
   the first set of periodic emission periods is synchronized with a new display frame data writing period of the illumination timing.

6. The device of claim 1, wherein the first set of periodic emission periods is associated with at least one display frame.

7. The device of claim 1, wherein the processor is configured to synchronize the first set of periodic emission periods and the second set of periodic emission periods, by adaptively configuring a first illumination timing of the light-emitting display and a second illumination timing of the optical emitter, to reduce effects of the light emitted by the optical emitter on the light-emitting display.

8. The device of claim 1, wherein:
   the at least one processor includes,
     an optical transceiver processor; and
     a display processor configured to output timing information to the light-emitting display and to the optical transceiver processor; wherein,
   the timing information output by the display processor defines, for the display frame, the first set of periodic emission periods and the set of periodic emission blanking periods; and
   the optical transceiver processor is configured to cause an optical transceiver including the optical emitter to emit or receive light in synchronization with the timing information output by the display processor.

9. The device of claim 8, wherein:
   the timing information output by the display processor defines at least one new display frame data writing period; and
   the optical transceiver processor prohibits the optical emitter from emitting light during the at least one new display frame data writing period.

10. The device of claim 8, wherein:
    the timing information output by the display processor defines the set of periodic emission blanking periods.

11. The device of claim 10, wherein:
    at least one emission blanking period in the set of periodic emission blanking periods includes a new display frame data writing period; and
    the optical transceiver processor prohibits the optical emitter from emitting light during the new display frame data writing period.

12. The device of claim 8, wherein:
    the light-emitting display has a first dimension and a second dimension, the second dimension orthogonal to the first dimension;
    the optical emitter is a first optical emitter;
    the optical transceiver includes at least a second optical emitter that has a different position with respect to the first optical emitter along the first dimension;
    the light-emitting display is refreshed line-by-line, advancing in the first dimension; and
    the optical transceiver processor is configured to align a modulation phase of the first optical emitter and the second optical emitter.

13. The device of claim 8, wherein:
    the light-emitting display has a first dimension and a second dimension, the second dimension orthogonal to the first dimension;
    the optical emitter is a first optical emitter;
    the optical transceiver includes at least a second optical emitter that has a different position with respect to the first optical emitter along the first dimension;
    the light-emitting display is refreshed line-by-line, advancing in the first dimension; and
    the optical transceiver processor is configured to modulate the first optical emitter and the second optical emitter at different frequencies and different phases.

14. A sensing method, comprising:
    modulating a set of pixels in a light-emitting display to generate a first optical output including, during a display frame, a first set of periodic emission periods interspersed with a set of periodic emission blanking periods;

modulating, in synchronization with the modulation of the set of pixels in the light-emitting display, a light output of an optical transceiver positioned to emit light through the light-emitting display, the light output of the optical transceiver including a second set of periodic emission periods; and sensing a portion of the light output using the optical transceiver; wherein, the light output of the optical transceiver is modulated to synchronize the first set of periodic emission periods and the second set of periodic emission periods, causing the second set of periodic emission periods to occur during, the set of periodic emission blanking periods; or a sequentially last emission period in the first set of periodic emission periods.

15. The sensing method of claim 14, wherein the optical transceiver comprises a first optical emitter, a second optical emitter, and an optical receiver, and the method further comprises:

aligning a modulation phase of the first optical emitter and the second optical emitter.

16. The sensing method of claim 15, further comprising:

integrating a portion of the light emitted by the first optical emitter and the second optical emitter at the optical receiver.

17. The sensing method of claim 14, wherein the optical transceiver comprises a first optical emitter, a second optical emitter, and an optical receiver, and the method further comprises:

modulating the first optical emitter and the second optical emitter at different frequencies and different phases.

18. The sensing method of claim 17, further comprising:

sensing a portion of the light emitted by the first optical emitter and the second optical emitter at the optical receiver;

outputting, from the optical receiver, a signal corresponding to the portion of the light sensed at the optical transceiver; and demodulating the signal to determine, a sensed portion of the light emitted by the first optical emitter; and a sensed portion of the light emitted by the second optical emitter.

19. The sensing method of claim 14, further comprising:

changing the modulation of the light output of the optical transceiver in response to a change in the modulation of the set of pixels in the light-emitting display.

* * * * *